(12) United States Patent
Volfson

(10) Patent No.: US 12,079,531 B2
(45) Date of Patent: Sep. 3, 2024

(54) INTERNAL DISPLAY FOR AN OPTICAL DEVICE

(71) Applicant: Torrey Pines Logic, Inc., San Diego, CA (US)

(72) Inventor: Leo Volfson, Del Mar, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 0 days.

(21) Appl. No.: 17/424,152

(22) PCT Filed: Jan. 15, 2020

(86) PCT No.: PCT/US2020/013753
§ 371 (c)(1),
(2) Date: Jul. 19, 2021

(87) PCT Pub. No.: WO2020/150397
PCT Pub. Date: Jul. 23, 2020

(65) Prior Publication Data
US 2022/0066719 A1 Mar. 3, 2022

Related U.S. Application Data

(60) Provisional application No. 62/794,702, filed on Jan. 20, 2019.

(51) Int. Cl.
*G06F 3/14* (2006.01)
*G02B 23/10* (2006.01)
*H04N 7/18* (2006.01)

(52) U.S. Cl.
CPC ............... *G06F 3/14* (2013.01); *G02B 23/10* (2013.01); *H04N 7/183* (2013.01)

(58) Field of Classification Search
CPC ............ G06F 3/14; G02B 23/10; H04N 7/183
(Continued)

(56) References Cited

U.S. PATENT DOCUMENTS

2010/0226017 A1 9/2010 Spaller
2011/0141223 A1 6/2011 Choe
(Continued)

FOREIGN PATENT DOCUMENTS

JP 2015225340 A 12/2015
KR 20170119081 A 10/2017
WO 2016033565 A1 3/2016

OTHER PUBLICATIONS

PCT International Search Report and Written Opinion in PCT International Application Serial No. PCT/US2020/013753 mailed on May 11, 2020 (10 pages).
(Continued)

*Primary Examiner* — John W Miller
*Assistant Examiner* — Omer Khalid
(74) *Attorney, Agent, or Firm* — Alliance IP, LLC

(57) ABSTRACT

A system can include an optical device and an accessory device. The optical device can include a housing, an objective lens at a first end of the housing and supported by the housing, an ocular lens at a second end of the housing and supported by the housing, and an optical path defined from the objective lens through the housing to the ocular lens, and a display device supported by the housing proximate the second end of the housing. The display device can include a display, hardware logic circuitry to process display data and to display the display data on the display, an input port, and a display holder to position the display in the optical path in the presence of a signal from the accessory device and to position the display out of the optical path in the absence of a signal from the accessory device.

18 Claims, 28 Drawing Sheets

(58) Field of Classification Search
USPC .......................................................... 348/143
See application file for complete search history.

(56) References Cited

U.S. PATENT DOCUMENTS

| | | |
|---|---|---|
| 2012/0033195 A1 | 2/2012 | Tai |
| 2013/0199074 A1 | 8/2013 | Paterson et al. |
| 2014/0328012 A1* | 11/2014 | Myerchin ............. G06F 1/1601 |
| | | 361/679.22 |
| 2016/0028970 A1 | 1/2016 | Masarik et al. |
| 2016/0223805 A1 | 8/2016 | Waterman et al. |
| 2017/0343317 A1 | 11/2017 | VanBecelaere |
| 2018/0039061 A1* | 2/2018 | Hairston ................ G02B 23/04 |
| 2018/0224244 A1* | 8/2018 | Havens ................... G02B 9/60 |
| 2019/0376764 A1* | 12/2019 | Hammond ................ F41G 1/38 |

OTHER PUBLICATIONS

EPO; Extended European Search Report and Written Opinion issued in EP Patent Application No. 20741106.7, dated Sep. 21, 2022; 10 pages.
China Patent Office First Office Action in Chinese Patent Application No. 2020080022094.6 mailed on Mar. 1, 2023 (17 pages).
China Patent Office Final Decision on Rejection in CN Patent Application Serial No. 202080022094.6 mailed on Sep. 20, 2023 (10 pages).

* cited by examiner

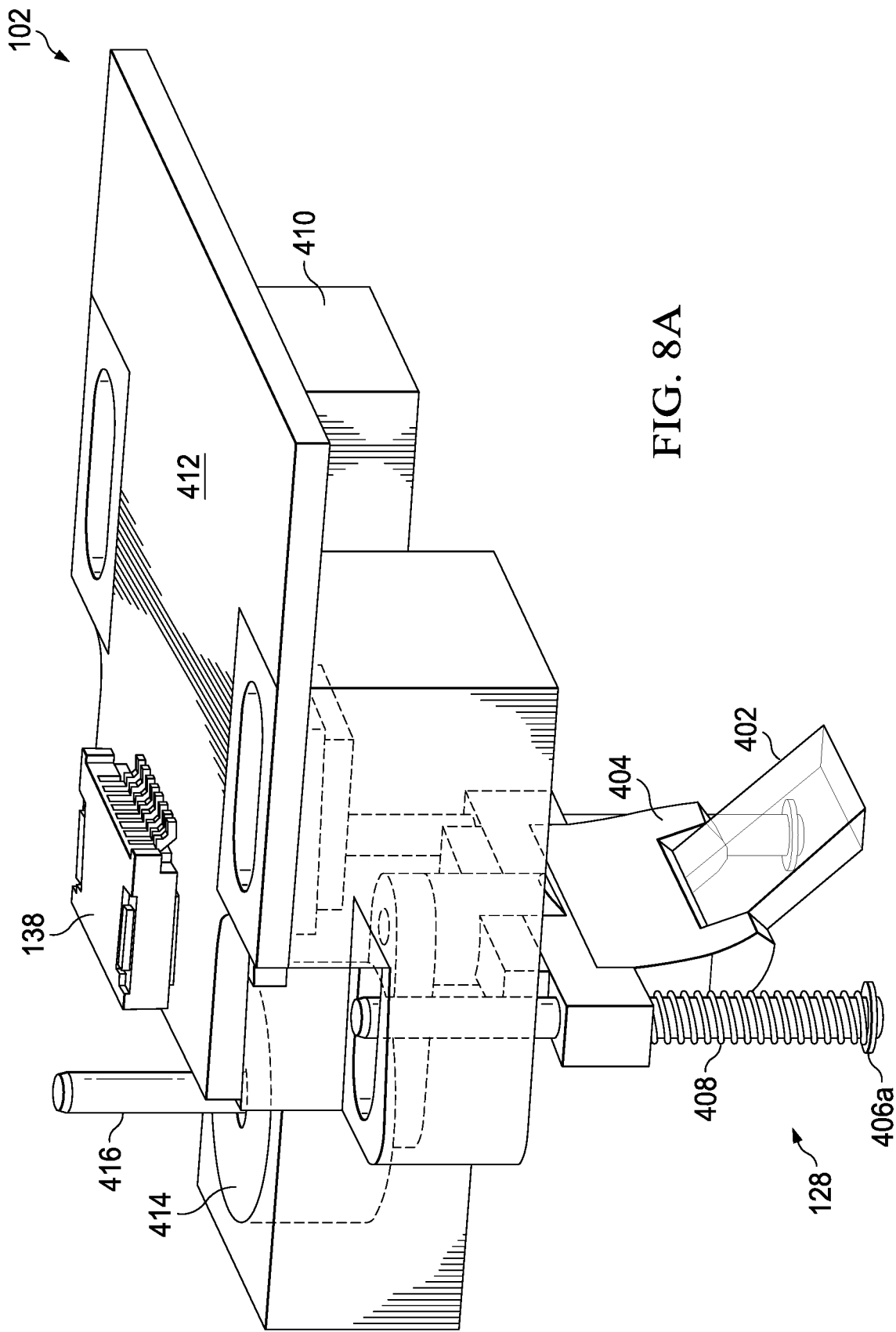

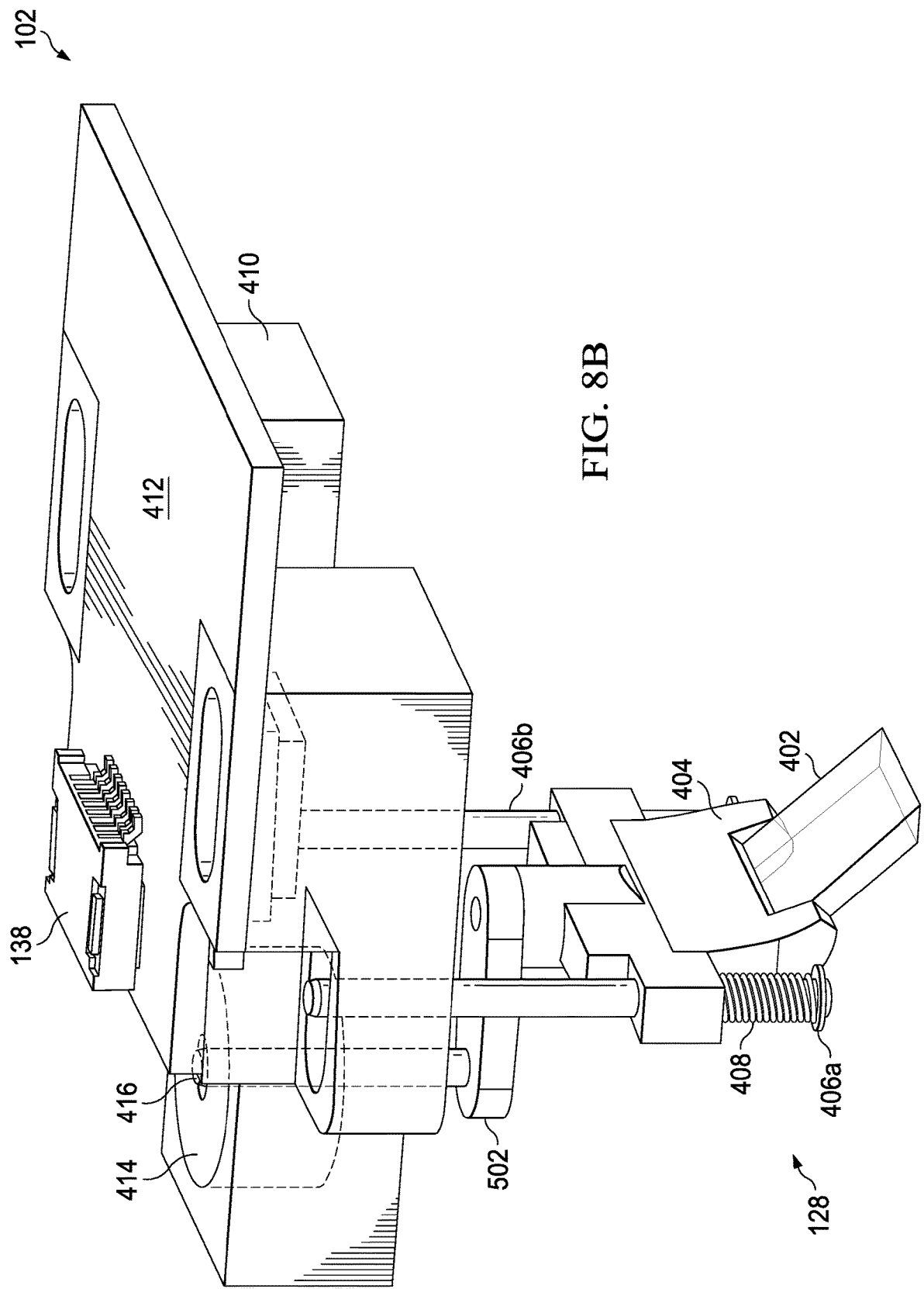

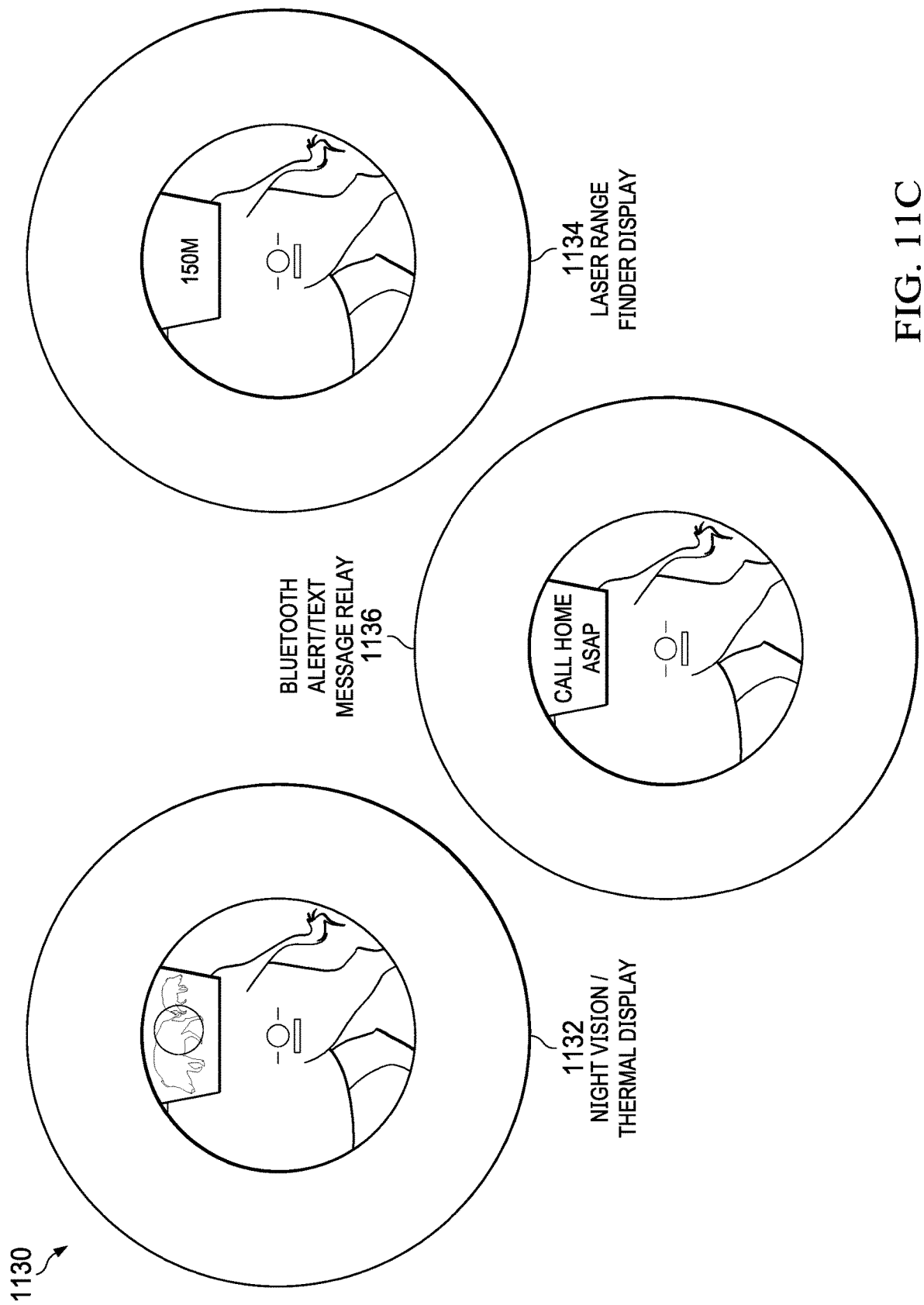

INTERNAL DISPLAY FOR AN OPTICAL DEVICE

CROSS REFERENCE TO RELATED APPLICATION

This application is a national stage application under 35 U.S.C. § 371 of PCT International Application Serial No. PCT/US2020/013753, filed on Jan. 15, 2020 and entitled INTERNAL DISPLAY FOR AN OPTICAL DEVICE, which application claims the benefit of priority pursuant to 35 U.S.C. § 119(e), this application claims the benefit of U.S. Provisional Patent Application Ser. No. 62/794,702, filed on Jan. 20, 2019, entitled, "Internal Display for an Optical Device," the entire contents of which are incorporated by reference herein. The disclosures of the prior applications are considered part of and are hereby incorporated by reference in their entirety in the disclosure of this application.

BACKGROUND

Lens-based optical devices can be used for myriad purposes, such as for magnified or non-magnified object/target observation, identification, or acquisition. For example, a lens-based optical device can include a scope for a firearm, a spotting scope, monoculars, binoculars, or other device.

SUMMARY

Aspects of the embodiments of the present disclosure can be directed to an optical device that includes a housing, an objective lens at a first end of the housing and supported by the housing, an ocular lens at a second end of the housing and supported by the housing, and an optical path defined from the objective lens through the housing to the ocular lens. The optical device can include a display device supported by the housing proximate the second end of the housing, the display device can include a display, hardware logic circuitry to process display data and to display the display data on the display, and a display holder to position the display into and out of the optical path based on power received by the display device.

Some embodiments may also include a port to electrically couple the display device with an accessory by a cable, and wherein the hardware logic circuitry is to receive power from the accessory, and upon receiving power from the accessory, to cause the display holder to position the display within the optical path.

In some embodiments, the display holder comprises a spring mechanism to move the display into the optical path.

In some embodiments, wherein the display holder comprises a magnetic element to move the display into the optical path.

Some embodiments may also include a light emitter to project optical-based information onto the display, wherein the display comprises a mirror to direct optical-based information from the light emitter to the ocular assembly. The light emitter can be a projector, light emitting diode, laser, raster scanner, or other emitter.

Some embodiments may also include a light detector; and wherein the mirror is to direct light from the optical path to the light detector. The light detector can be one of a camera, charge coupled device (CCD), or light-sensitive diode, or other type of light sensing device.

In some embodiments, the optical device comprises a scope or binoculars.

Aspects of the embodiments can include a system that includes an optical device; and an accessory device. The optical device can include a housing, an objective lens at a first end of the housing and supported by the housing, an ocular lens at a second end of the housing and supported by the housing, and an optical path defined from the objective lens through the housing to the ocular lens. The optical device can also include a display device supported by the housing proximate the second end of the housing, the display device can include a display, hardware logic circuitry to process display data and to display the display data on the display, an input port, and a display holder to position the display in the optical path in the presence of a signal from the accessory device and to position the display out of the optical path in the absence of a signal from the accessory device. The accessory device coupled to the display device through the input port by a cable, the accessory device can include a power source to power the accessory device and the display device; and hardware circuitry to receive display protocol information from the display device, configure display data based on the display protocol of the display device, and transmit the configured display data to the display device.

In some embodiments, the hardware logic circuitry is to receive power from the accessory, and upon receiving power from the accessory, to cause the display holder to position the display within the optical path.

In some embodiments, the display holder comprises a spring mechanism to move the display into the optical path based on receiving a signal from the accessory device.

In some embodiments, the display holder comprises a magnetic element, the magnetic element to create a magnetic field in the presence of a signal originating from the accessory device, the magnetic field to cause the display holder to position the display into the optical path.

Some embodiments can include a light emitter to project optical-based information onto the display, wherein the display comprises a mirror to direct optical-based information from the light emitter to the ocular assembly.

Some embodiments can include a light detector; and wherein the mirror is to direct light from the optical path to the light detector. In some embodiments, the light detector comprises one of a camera, charge coupled device (CCD), or light-sensitive diode, or other light sensing device.

In some embodiments, the optical device comprises a scope or binoculars.

In some embodiments, the accessory device comprises one or more of a range finder device, a thermal imager, a night vision scope, a target acquisition device, a communications device, or a windage device.

Aspects of the embodiments can include a method that includes receiving, at a display device of an optical device, a first input signal from an accessory device; causing a display of the display device to move into an optical path of the optical device based on the first input signal; receiving, at the display device, a second input signal, the second input signal comprising information to be displayed; and displaying the information on the display.

Some embodiments can include receiving an initialization signal prior to the first input signal; responding to the initialization signal with device driver information associated with the display device.

Some embodiments can include receiving optical data from the optical path; capturing the optical data by an image sensor; converting the optical data into electrical signals; transmitting the electrical signals to the accessory device;

receiving feedback information from the accessory device in the form of displayable data; and displaying the feedback information on the display.

BRIEF DESCRIPTION OF THE DRAWINGS

FIGS. 8A-B are schematic diagrams illustrating operation of an example mirror retraction and extension element within an example optical device in accordance with embodiments of the present disclosure.

FIGS. 11A-C are schematic diagrams illustrating example data displayed on an internal display device in accordance with embodiments of the present disclosure.

Figures are not drawn to scale.

DETAILED DESCRIPTION

This disclosure describes an internal display device for an optical device as well as optical devices that include an internal display. The internal display device can include certain non-limiting features, including an accessory-provided power source, automatic retraction, a communications port for electrically and communicatively coupling the internal display to an external accessory by a communications link, a wireless transceiver for sending and receiving information from the internal display device to other devices, and/or an automatic brightness adjustment mechanism. The internal display device can be electrically and communicatively coupled to an accessory, which can provide power, data, configuration information, and other types of information across a communications protocol. The internal display device can include a light emission device to emit light-based information onto the display device mirror. The internal display device can also include a camera system for receiving optical information from the optical device for transmission to the accessory across the communications link.

Figure 1A:
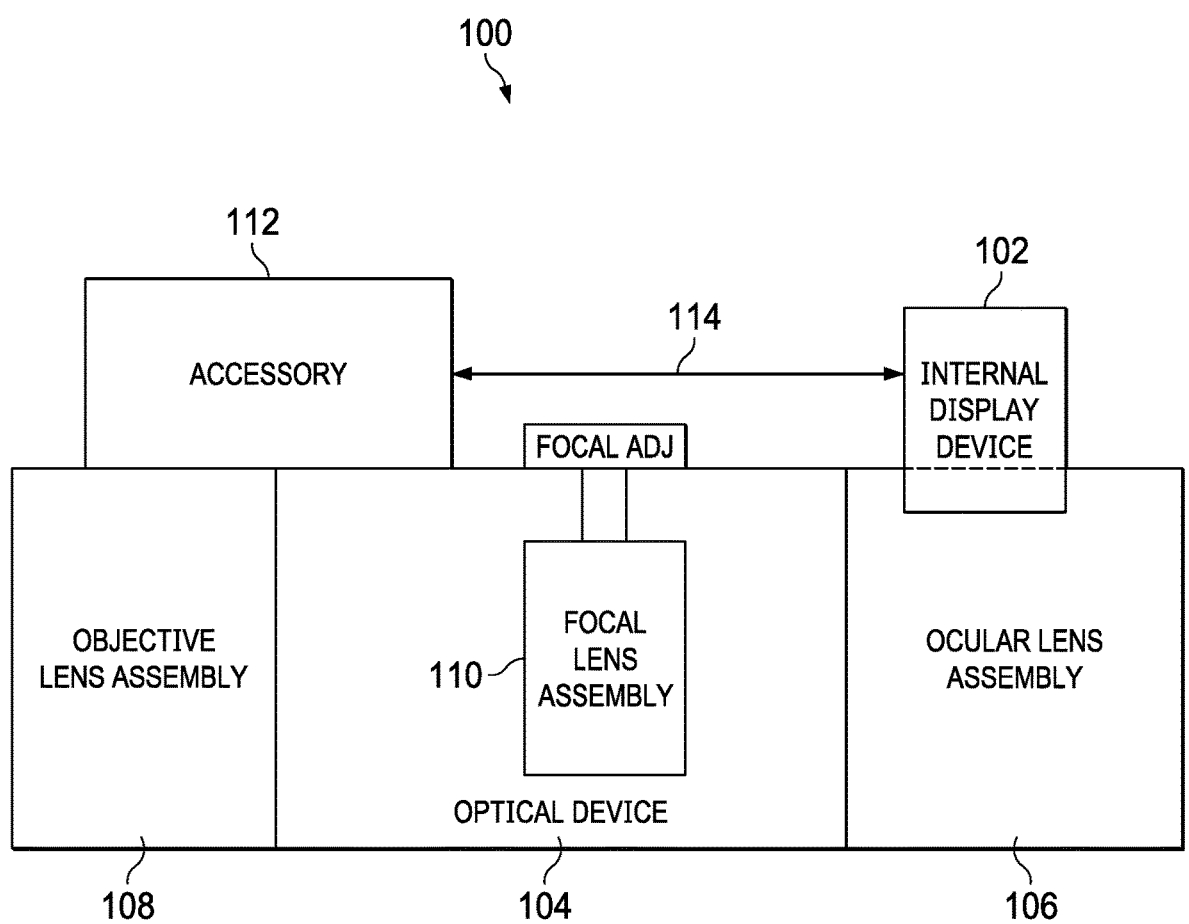
FIGS. 1A-B are schematic block diagrams of an example optical devices that include an internal display device in accordance with embodiments of the present disclosure.
Figure 1B:
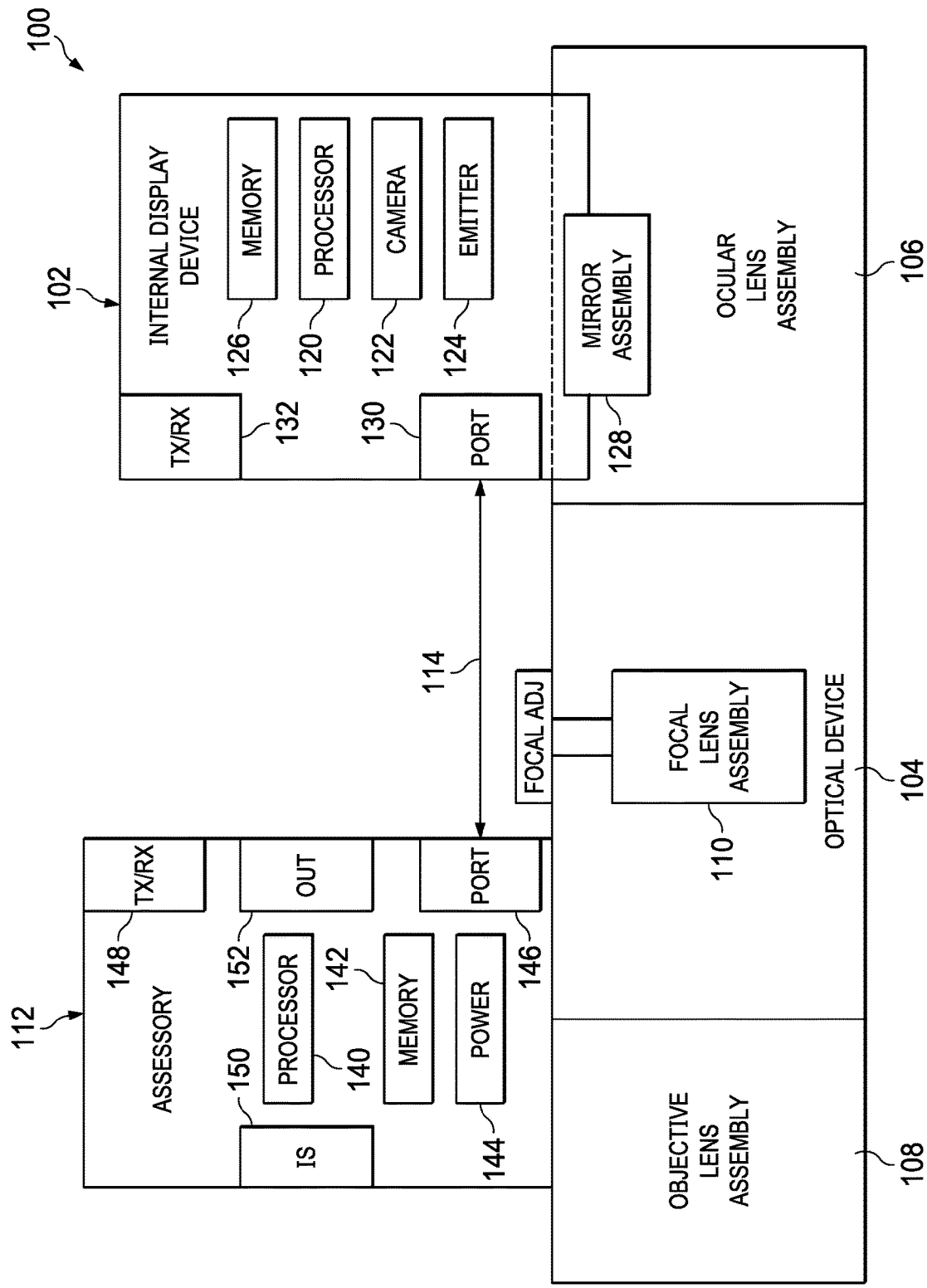

FIGS. 1A-B are schematic block diagrams of example optical devices that include an internal display device in accordance with embodiments of the present disclosure. FIG. 1A is a schematic diagram illustrating an example optical system 100. Optical system 100 includes an optical device 104. Optical device 104 can be a rifle scope, spotting scope, binocular, monocular, or other device that uses lenses for object acquisition, identification, magnification, and/or observation. The optical device 104 can include an ocular assembly 106 at a first end of the optical device and an objective assembly 108 at a second end of the optical device. The optical device 104 can also include a focal assembly 110 with focal lens adjustment mechanisms.

The optical device 104 can include an internal display device 102. The internal display device 102 can be positioned as part of the ocular assembly, or more specifically, between the focal assembly and the ocular lens(es) of the ocular assembly. The internal display device 102 can be electrically and communicatively coupled to the accessory 112 by a link 114. The link 114 can be a wireline link that uses a proprietary communications protocol, or can be a link that uses another communications protocol, such as a USB link, microUSB link, Thunderbolt link, PCIe link, Firewire link, HDMI link, displayPort link, DVI link, miniDisplayport link, etc. (Ports 130 and 140 shown in FIG. 1A can be compliant with one or more of the above recited link protocols.) The link 114 can provide power from the accessory to the internal display device 102, as well as provide data to the internal display device for displaying. The accessory 112 can provide data to the internal display device 102 in a format compatible for displaying onto the internal display device 102, or the accessory 112 can provide data to the internal display device 102 that the internal display device 102 can format for displaying.

In embodiments, upon connection to an accessory 112 by a link 114, the internal display device 102 can perform a handshake with the accessory 112 to exchange display protocol information, device drivers, power requirements, communications protocols, etc. The accessory 112 can use this information to supply power to the internal display device 102, provide information for displaying on the internal display device 102, and performing other operations.

Accessory 112 can include many different types of devices. Non-limiting examples of accessory 112 can include one, more than one, or a combination of thermal imaging device, a range finding device, communications device (e.g., cellular device, Wi-Fi-enabled device, etc.), an augmented reality device, or other device that can interface with the internal display device 102 for providing information to be projected onto the internal display device 102. The accessory can be a device that includes a cellular radio transceiver, Wi-Fi radio, Bluetooth transceiver, or other communications protocol for sending and/or receiving information, synchronizing information with other accessories or devices, or other communications transactions.

FIG. 1B is a schematic block diagram illustrating example components of the internal display device 102 in accordance with embodiments of the present disclosure. The internal display device 102 can include a processor 120. Processor 120 can include any type of hardware processor, such as a CPU, microcontroller, ASIC, FPGA controller, etc. The processor 120 can generally control various functions of the internal display device, including, but not limited to performing initialization (handshake) operations with a connected accessory 112, converting received data into a format for display, converting data to be transmitted into a format for transmission, compressing data, controlling transmission and reception, controlling wireless communications, and/or control display parameters, such as brightness, contrast, colors, focus, size, etc. Memory 126 can be any memory hardware, such as a cache memory, random access memory, solid state drive, flash memory, or other memory device. Memory 126 can be used to store configuration information, device drivers, data received, data for transmission, to cache data, etc.

The internal display device 102 can be coupled to accessory 112 by link 114 by port 130. Port 130 can be compliant with a proprietary communications protocol, or can be a link that uses another communications protocol, such as a USB link, microUSB link, Thunderbolt link, PCIe link, Firewire link, HDMI link, displayPort link, DVI link, miniDisplayport link, etc.

Emitter

The internal display device 102 can include an emitter 124. The emitter 124 can include an image or video projector, an LCD display, LED display, laser-based projector, other type of display or monitor, etc. The emitter 124 can receive information from the accessory 112 (or from the processor 120) for projecting within the ocular assembly (e.g., onto mirror assembly 128). The emitter 124 can emit light-based information based on display formatting, configuration, and protocols for displaying desired information from the accessory 112 onto the mirror assembly 128. Non-limiting examples of information displayed onto the mirror assembly 128 are shown in FIGS. 10 and 11A-C. For example, the image data projected onto the mirror assembly 128 can include, but is not limited to, thermal image information, range/distance information, text messages or other notifications, object information (e.g., overlay information such as through augmented reality), object location information (e.g., arrow pointing towards the location of a desired object, text directing an operator to point in a different direction, etc.), night vision information, wind direction information, or other information.

Camera

The internal display device 102 can also include a light detector 122 or other image receiving device. Light detector 122 can include an image sensor, charged coupled device (CCD), camera, or other type light-sensitive device that can receive optical information from the optical device 104 and convert the optical information into electrical information. The internal display device 102 can process the captured image information by processor 120 and send image data captured by the camera 122 to accessory 112 by port 130 across link 114 for processing.

Mirror Assembly

The internal display device 102 can include a mirror assembly 128. Mirror assembly 128 can include a mirror element that is supported by a housing or holder. The mirror housing can be retractable by, e.g., an (electro)magnetic device, a spring hinge, gravity-based mechanism, or other retraction mechanism. In embodiments, the mirror assembly 128 can be extended as a default state, and the electronics 138 can provide control functionality to retract the mirror assembly 128. The retraction of the mirror can move the mirror element from the field of view of the user (i.e., outside of the optical pathway of the optical device 104). The mirror housing can be powered upon receiving power from the accessory 112, and can extend the mirror upon receiving power, while retracting the mirror when power is cut off. Thus, upon losing power, the mirror assembly 128 automatically removes the mirror element from the field of view of the user, allowing the user to use the optical device 104 without obstruction. In embodiments, mirror assembly 128 can position a display element in the optical path of the optical device 104. The optical path of the optical device 104 can be defined between the objective lens and the ocular lens, where light can enter the object lens, traverse a space and any other lenses between the objective lens and ocular lens, and can exit the ocular lens. A display or mirror element positioned within the optical path can transmit or reflect light from the display or mirror element in the optical path and towards the ocular lens. Likewise, the display or mirror element can receive light from the optical path and reflect light into a light sensor in the internal display device 102.

The mirror element can be any size and can have an angle to reflect light from the emitter 124 towards the ocular lenses. The mirror element can also reflect light from the focal assembly towards the camera 122. The mirror element can include a transparent mirror, one-way mirror, two-way mirror, etc. The mirror assembly 128 can also support a prism, beam splitter, or other optical element for redirecting light from one direction to another. The mirror can be positioned anywhere within the optical path of the optical element, depending on the application. The examples illustrated herein show the mirror element near the top of the optical pathway, but other configurations are contemplated.

Accessory

As mentioned above, the accessory 112 can be or can include many different types of devices. The example accessory 112 shown in FIG. 1B is shown to be mounted to the optical device 104, though it does not have to be. The accessory 112 can include a processor 140 that can be implemented in hardware circuitry, and can make use of hardware, software, or firmware logic. The accessory 112 can include a memory 142 for storing information. The accessory 112 can include an image sensor 150 for receiving optical data, such as thermal, IR, night-vision, visible light, etc. The accessory 112 can also include an output 152, which can be a screen, assembly, or other output. The accessory 112 can include a transceiver 148 for sending and receiving data. Transceiver 148 can include a cellular radio, Wi-Fi transceiver, Bluetooth transceiver, etc. The accessory 112 can also include a port 146. Port 146 can be compliant with a proprietary communications protocol, or can be a link that uses another communications protocol, such as a USB link, microUSB link, Thunderbolt link, PCIe link, Firewire link, HDMI link, displayPort link, DVI link, miniDisplayport link, etc.

The accessory 112 can include a power supply 144. Power supply 144 can include a rechargeable battery, lithium-ion battery, alkaline battery, etc. The power supply 144 can provide power to the accessory 112 as well as to the internal display device 102 through link 114. In embodiments, the internal display device can be activated when coupled to a powered accessory 112 by the link 114.

Displayed Information

The internal display device 102 can display various types of image data onto the mirror assembly 128. The image data can be output from the accessory 112, provided by the accessory 112 or received across a wireless transceiver. The image data received by the internal display device 102 can be formatted, either by the accessory 112 or by the internal display device 102, for displaying by the emitter 124 to the mirror assembly 128. As an example, the format for the displayed information can be similar to that of a computer monitor, where the image information is processed by a processor and displayed on the monitor. The style, color, and other configuration of the displayed information depends on how that displayed information is formatted. The formatting can be based on the accessory type, the information type, the link protocol, link bandwidth, user settings, quality level, tier of service, etc. As mentioned elsewhere, displayed information can include, but is not limited to, range/distance information, infrared imagery, night vision imagery, overly information/imagery, location information, wind information, notification information, text (SMS) messages, MMS messages, etc.

Augmented Reality

The accessory 112 can send image overlay data about the optical information back to the internal display device 102 for overlay onto the optical information (e.g., in a manner similar to augmented reality). In some embodiments, the internal display device 102 can transmit the captured image data directly to another location by transceiver 132.

In some embodiments, the accessory 112 can include an image sensor 150 that can receive optical information that includes an object. The processor 140 can process the image data collected by the image sensor 150 for augmented reality display.

Figure 10:
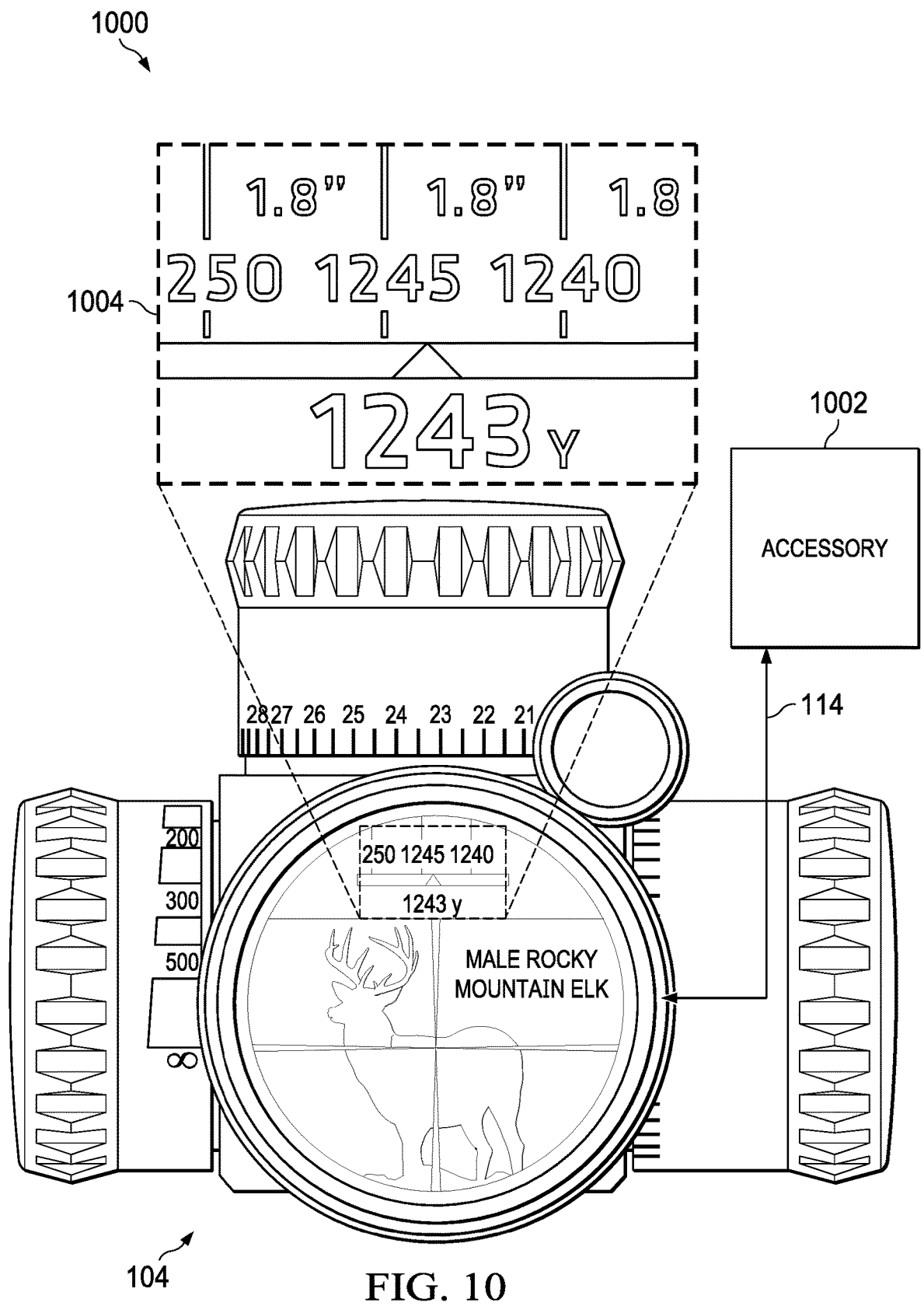
FIG. 10 is a schematic diagram illustrating example range finding data displayed on an internal display device in an optical device in accordance with embodiments of the present disclosure.

In either scenario of where the object's optical information is captured (either by camera 122 or by accessory 112), for example, the processor 140 can determine a name of the object, or the processor 140 can transmit the image data by transceiver 148 to another location for processing to identify a name of the object. The processor 140 can convert the name of the object into a format for augmented reality display onto the internal display device 102. The accessory 112 can send the information to the internal display device 102 by a port 146 across link 114 to port 130 in the internal display device 102. The processor 120 can process the received data, and the emitter 124 can be used to emit the name of the object by projecting the name onto the mirror in a location that corresponds to the object. Augmented reality overlay information for various objects can be projected in a similar manner. FIG. 10 illustrates augmented reality information displayed with optical object information shown through the optical device 104.

Link

The link 114 can electrically and communicatively couple the accessory 112 to the internal display device 102. The link 114 can be any type of wired link, such as a USB link, microUSB link, Thunderbolt link, PCIe link, Firewire link, HDMI link, displayPort link, DVI link, miniDisplayport link, etc. In embodiments, the link can be a proprietary link that uses a proprietary link protocol. Link 114 can be used to provide various functions between the accessory 112 to the internal display device 102, including, but not limited to, power, power management, configuration information (handshake), functionality information (e.g., the link can be used to exchange capability information between the accessory and the internal display device 102), image information, notifications, or other information.

Figure 2:
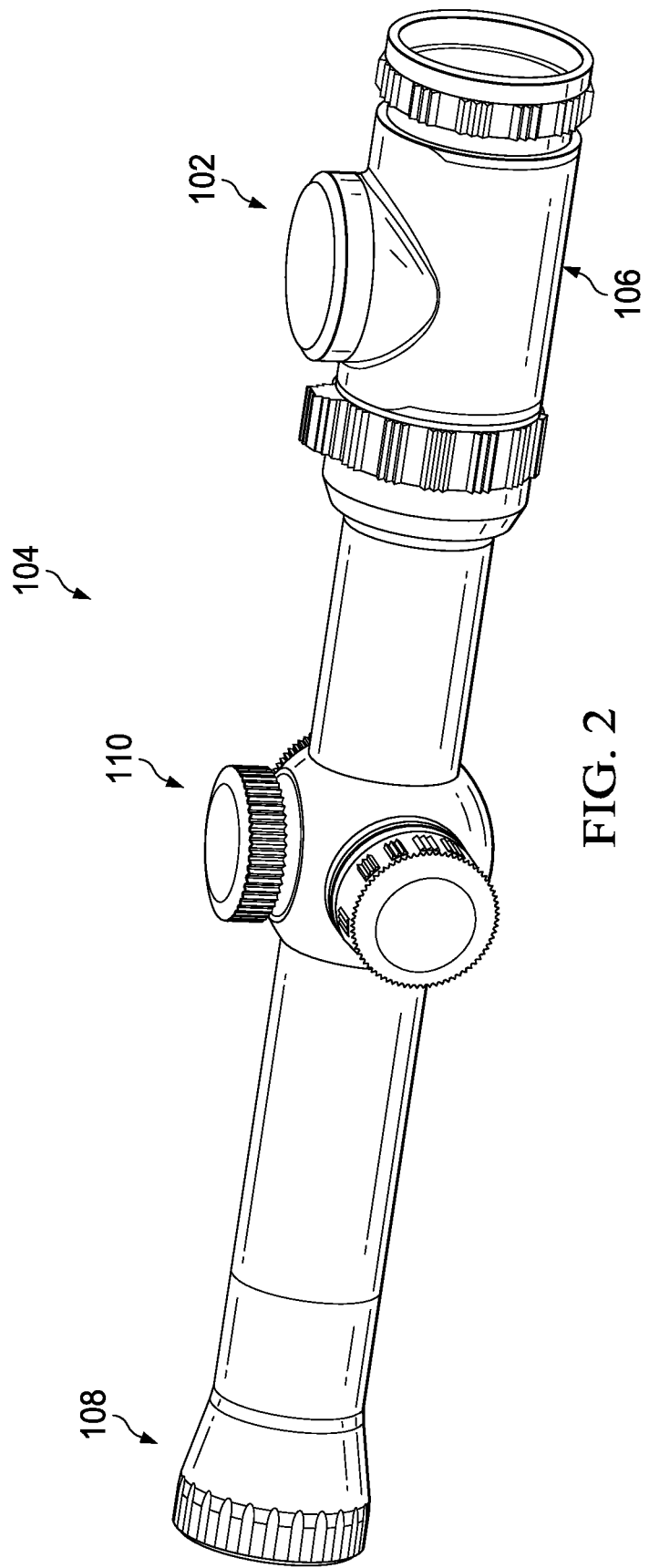
FIG. 2 is a schematic diagram illustrating an example of an optical device that includes an internal display device in accordance with embodiments of the present disclosure.

FIG. 2 is a schematic diagram 200 illustrating an example of an optical device 104 that includes an internal display device 102 in accordance with embodiments of the present disclosure. In this example, the optical device 104 is a lens-based scope. The optical device 104 can be other types of devices. The scope can include an objective assembly 108, a focal assembly 110, and an ocular assembly 106. The internal display device 102 can be located proximate the ocular assembly 106, part of the ocular assembly 106, or between the focal assembly 110 and the ocular assembly 106.

The objective assembly, ocular assembly, and focal assembly can each include one or more lenses for magnification, focus, correction, redirection, and collimation of light.

Figure 3:
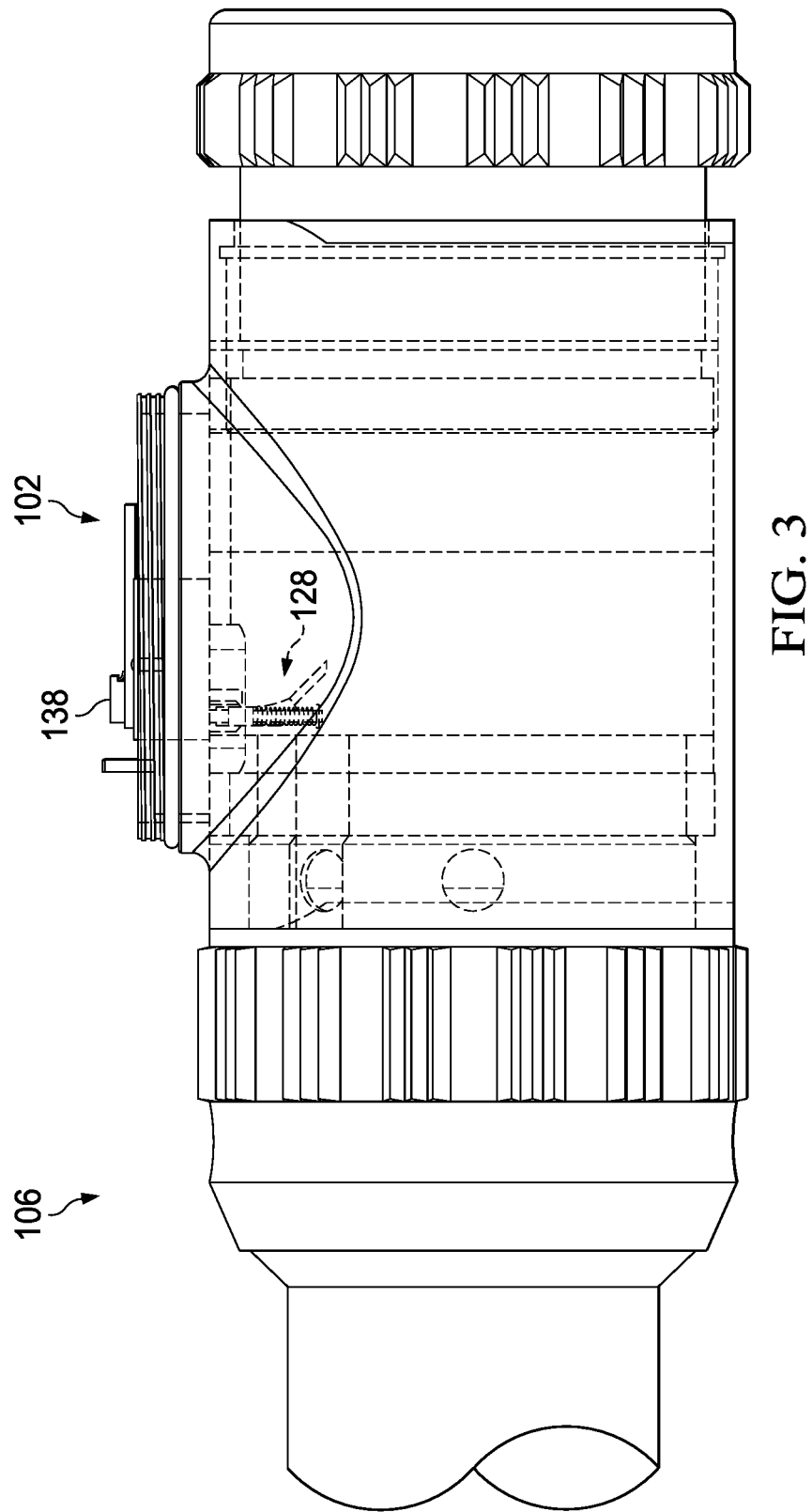
FIG. 3 is a schematic diagram of an ocular assembly portion of an optical device illustrating an internal display device in accordance with embodiments of the present disclosure.

FIG. 3 is a schematic diagram 300 of an ocular assembly 106 of an optical device 104 illustrating an internal display device 102 in accordance with embodiments of the present disclosure. The position of the internal display device 102 within the ocular assembly 106 is shown as an example implementation, and other positions on or in the optical device 104 are contemplated.

The internal display device 102 is shown as a component-level illustration as an example, and such an illustration is not meant to be limiting with respect to the position, type, or number of components. The internal display device 102 can include electronic circuitry 138. The electronic circuitry 138 can include a processor, memory, ports, interconnects, wired or wireless transceiver, circuit boards, integrated circuits, ASICs, FPGA, printed circuit boards, traces, cooling, and other electrical components to allow the internal display device to function. The electronic circuitry 138 can include hardware and stored software or firmware for providing various functions for the internal display device 102, including, but not limited to, formatting image data, transmitting and/or receiving image data across a wired or wireless link, displaying/projecting image data, capturing optical data and converting optical data into electrical signals, receiving power, using received power to activate the internal display device functions, extending the mirror assembly 128 into the optical path of the optical device 104, adjusting settings, such as brightness, etc.

The internal display device 102 can also include a mirror assembly 128. Mirror assembly 128 can include a mirror or other optical element for redirecting light from the emitter to the optical path and from the optical path to an image sensor.

Figure 4A:
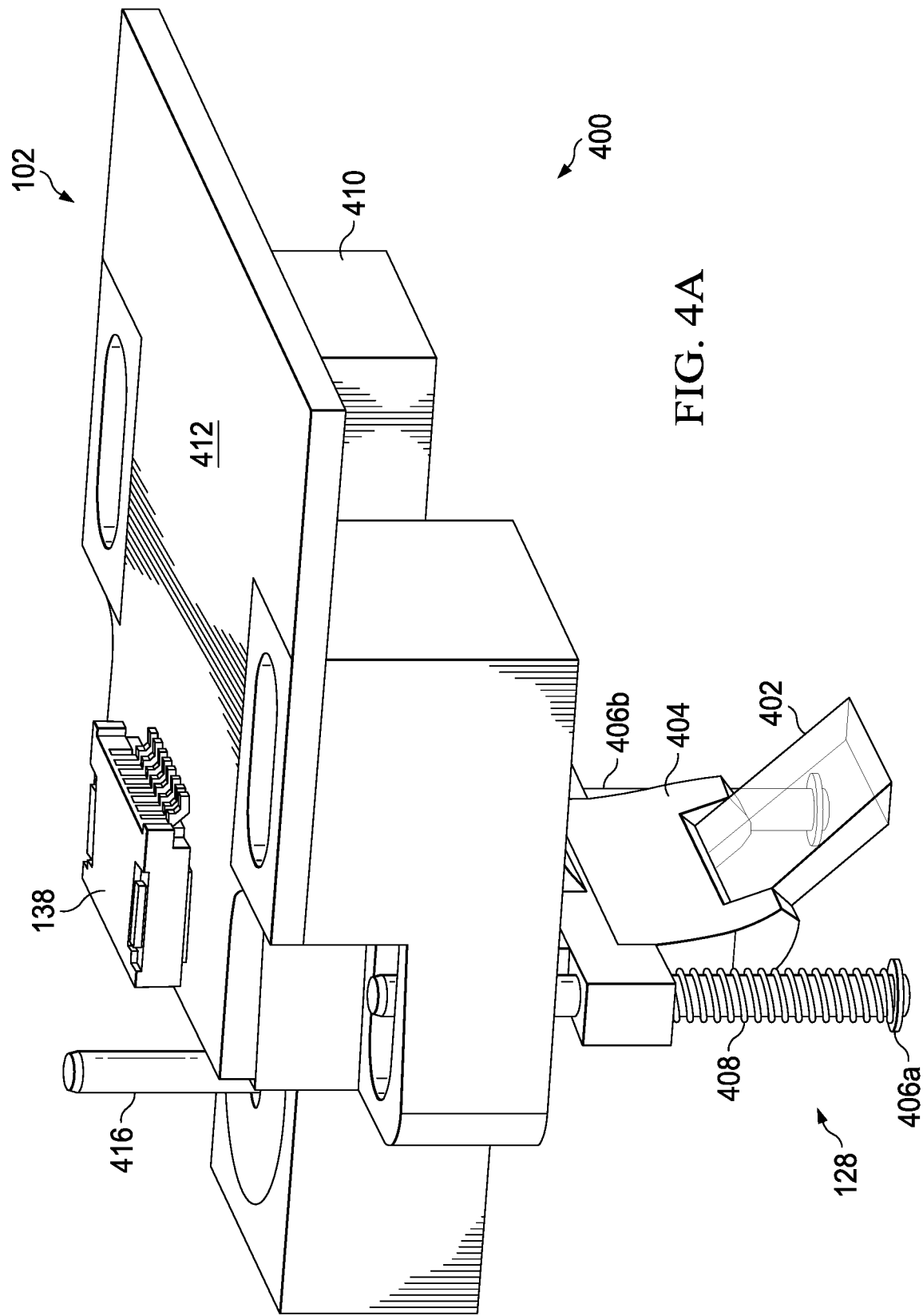
FIGS. 4A-4C are schematic diagrams of various perspective views of an example internal display device in accordance with embodiments of the present disclosure.
Figure 4B:
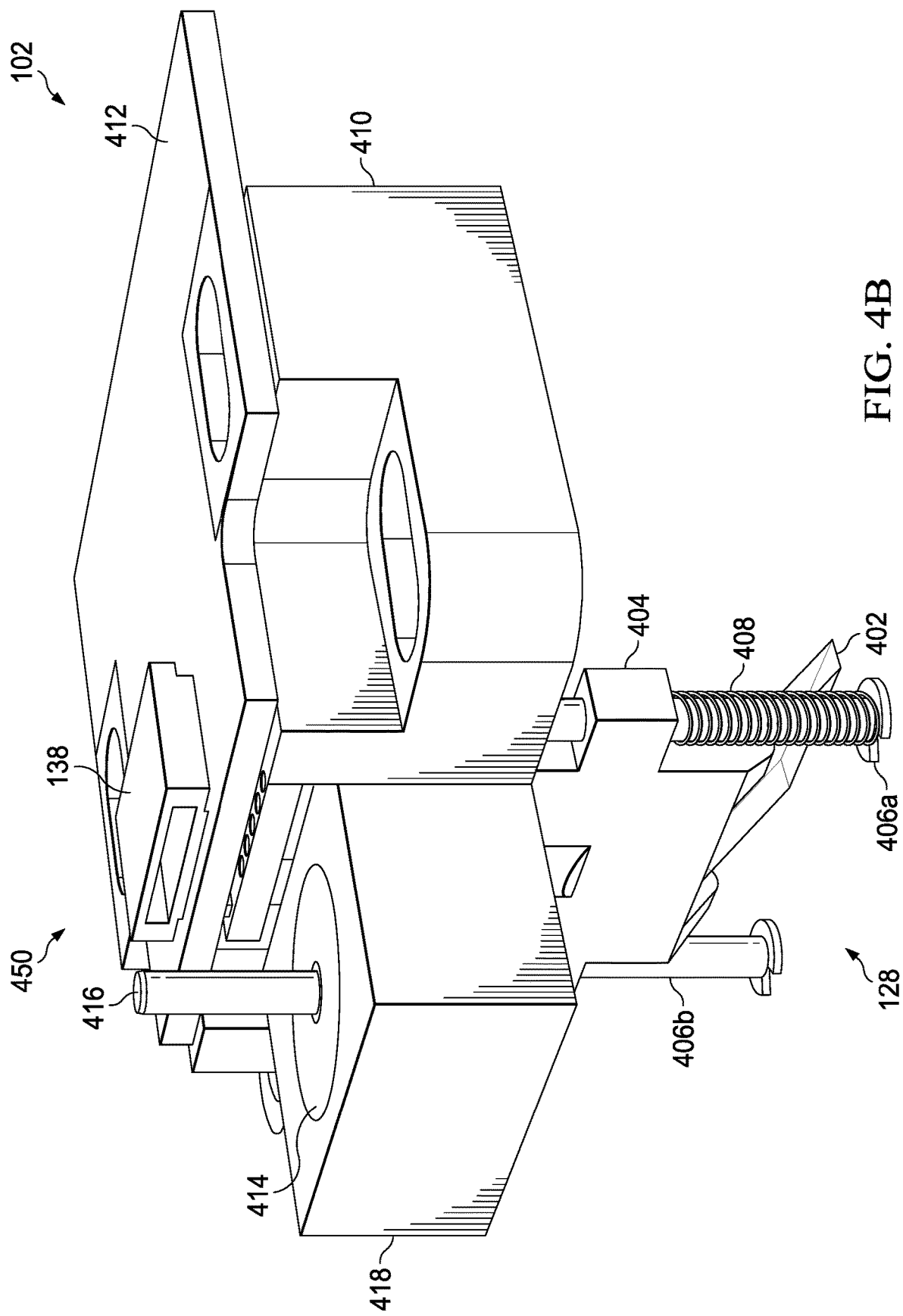
Figure 4C:
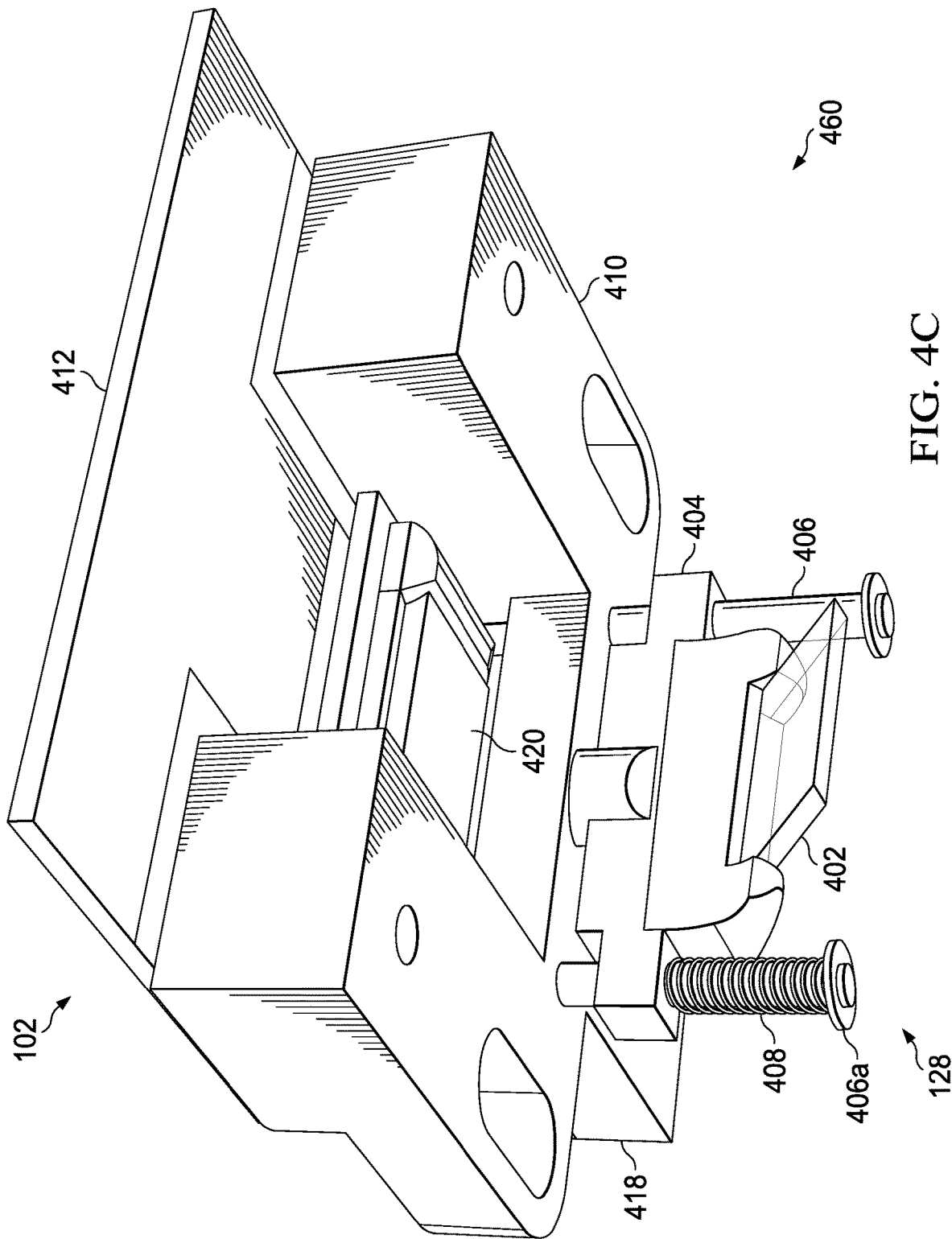

FIGS. 4A-4C are schematic diagrams of various perspective views of an example internal display device in accordance with embodiments of the present disclosure. FIG. 4A is a schematic diagram of a first perspective view 400 of an example internal display device 102 in accordance with embodiments of the present disclosure. The first perspective view 400 shows the example mirror assembly 128 in more detail. The mirror assembly 128 includes a mirror 402. Mirror 402 can be held in place at an appropriate angle relative to the optical path and the emitter by a mirror holder 404. The mirror 402 is an example optical element, and other optical elements for redirecting optical information can also be used. The mirror 402 can be a transparent mirror, two-way mirror, one-way mirror, etc.

The mirror holder 404 can be secured to a housing 410 by one or more dowel pins. In the example shown here, the mirror holder 404 is secured to housing 410 by a retraction dowel pin 406a and 406b. A spring element 408 pushes the mirror holder 404 in a retraction state when no power is provided to the internal display device 102 (or if a retraction setting is selected). More on the retraction and extension of the mirror holder 404 is described later.

The housing 410 can couple the mirror holder 404 to the internal display device PCB 412 and electronics 138. Turning to FIG. 4B, a second perspective view 450 of the internal display device 102 illustrates that the housing 410 can also secure an electromagnetic element 414 and an axial magnetic element 416. When powered, the electromagnetic element 414 can cause the axial magnetic element to slide downwards, which causes the mirror holder to push against the retraction springs 408, which in turn, causes the mirror 402 to enter the optical path. Power kept to the electromagnetic element 414 keeps the mirror within the optical path, and a removal of power to the electromagnetic element allows the springs 408 to retract the mirror out of the optical path.

FIG. 4C is a third perspective view 460 of internal display device 102 and shows example positions of the emitter 124 and camera 122 (e.g., within emitter housing 420). The mirror 402 is held in place by mirror holder 404 at an appropriate angle such that light emitted from the emitter 124 is redirected towards an ocular lens and the eye(s) of a user. The mirror 402 can project emitted light towards different locations of the optical path, such as the top, middle, bottom, etc., depending on the configuration and use case. For example, for range information, a top location may be more desirable; but for augmented reality, the augmented reality information may be projected on the entire optical path. Multiple locations can also be used. For example, range information at the top and wind information at the bottom, while the middle of the optical path is kept clear. The emitter can project the appropriate information in the appropriate way, such that a static mirror position can be used to display the information in the correct place in the optical path.

Figure 5:
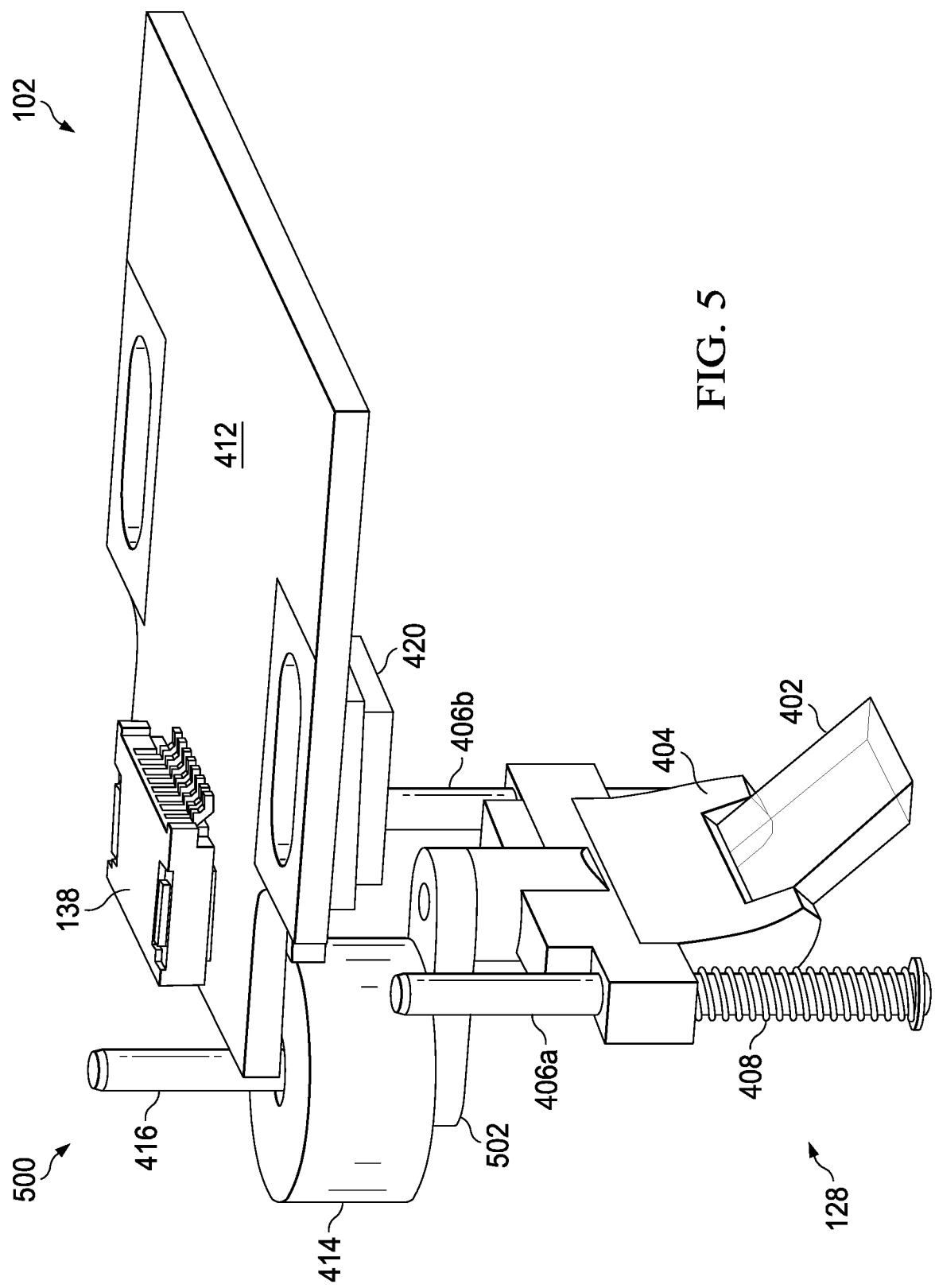
FIG. 5 is a schematic diagram of an example internal display device illustrating an example mirror retraction and extension element in accordance with embodiments of the present disclosure.

FIG. 5 is a schematic diagram 500 of an example internal display device 102 illustrating an example mirror retraction and extension mechanism in accordance with embodiments of the present disclosure. The example mirror retraction and extension mechanism includes an electromagnetic element 414. Electromagnetic element 414 is shown to be an annular disk shaped magnetic element with an axial magnetic element 416 positioned through the annulus. The axial magnetic element 416 is rigidly affixed to a coupler 502. Coupler 502 is rigidly affixed to the mirror holder 404. The retraction dowel pins 406a-b are rigidly affixed to the housing 410 (shown in FIGS. 4A-C).

Figure 6A:
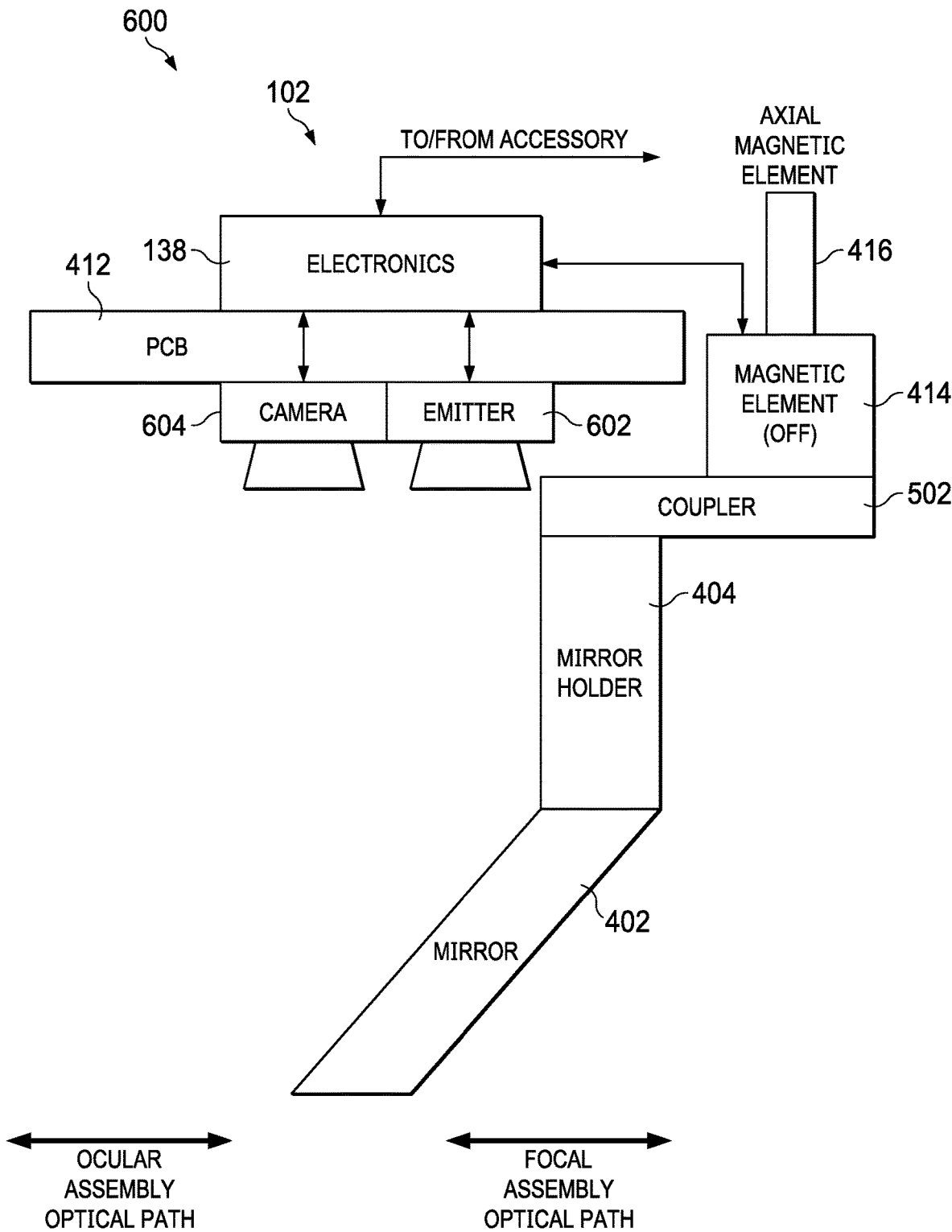
FIGS. 6A-D are schematic block diagrams illustrating operation of an example mirror retraction and extension element in accordance with embodiments of the present disclosure.
Figure 6B:
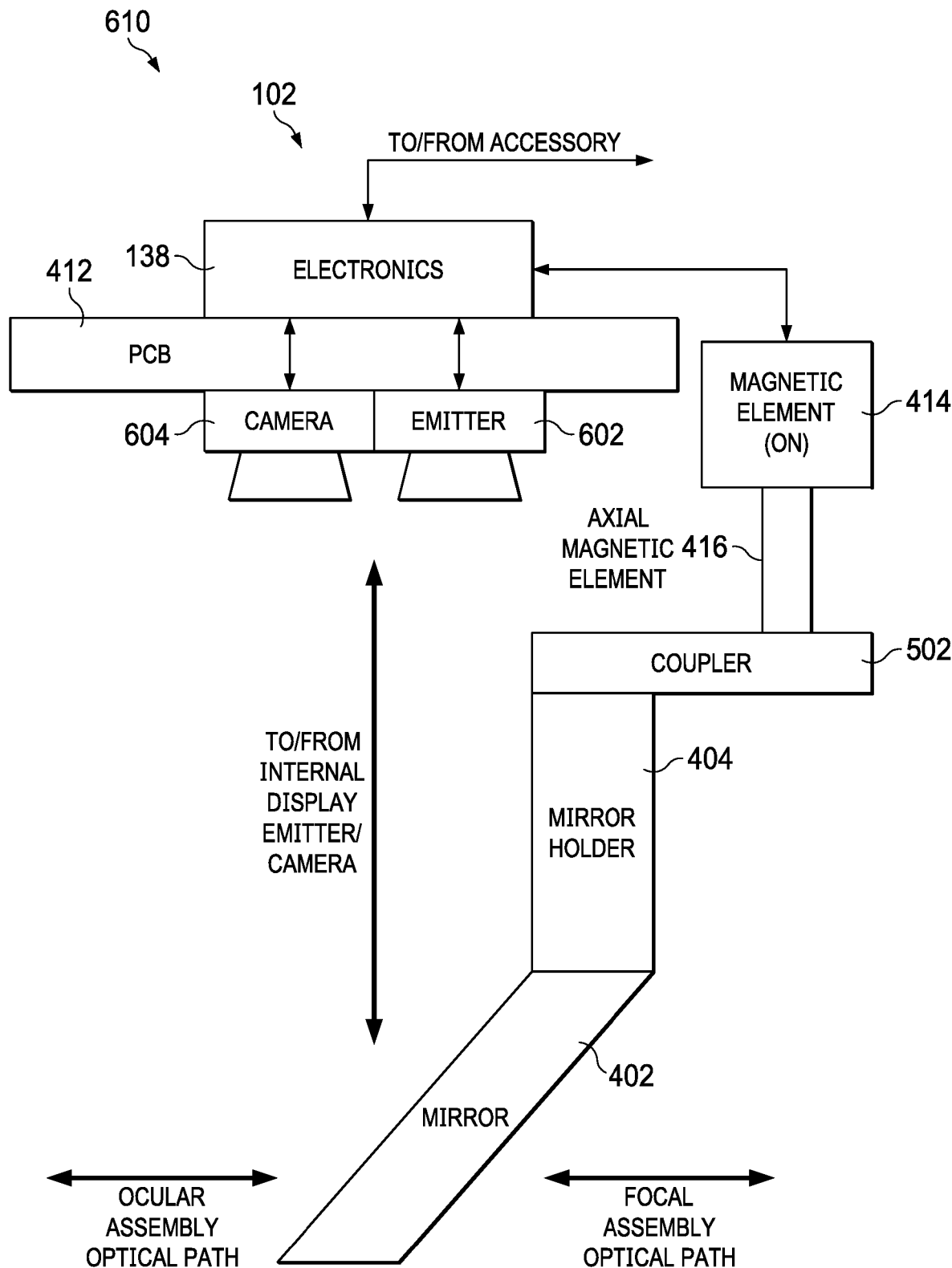

FIGS. 6A-D are schematic block diagrams illustrating operation of an example mirror retraction and extension element in accordance with embodiments of the present disclosure. FIG. 6A illustrates a first example extension/retraction mechanism for the internal display device, with the device in a retracted state 600. FIG. 6B illustrates the first example extension/retraction mechanism for the internal display device, with the device in an extended state 610. In an unpowered or retracted state, no power is provided to the electromagnetic element 414. When the electromagnetic element 414 is off, the springs 408 push the mirror holder upwards, and the mirror element 402 out of the optical path. Without power to the electromagnetic element 414, there is no magnetic interaction between the electromagnetic element 414 and the axial magnetic element 416 to counter the spring tension of springs 408. Electronics 138 can receive power from accessory 112.

In FIG. 6B, power is delivered to the electronics 138. Electronics 138 can provide power to the electromagnetic element 414 (either automatically or by activation by the user). When the electromagnetic element 414 is powered/activated, the axial magnetic element 416 slides downwards, pushing the coupler downwards, and in turn, sliding the housing downwards along the dowel pins 406a-b against the springs 408. The sizes of the axial magnetic element 416, the dowel pins 406a-b, the mirror 402, mirror holder 404, etc., are selected to allow for such extension and retraction, and also to ensure that in a retracted state, the mirror 402 is out of the optical path, and ensure that in an extended state, the mirror is in the optical path, while also positioning the mirror within the path of the emitter 602 and image sensor 604.

Figure 6C:
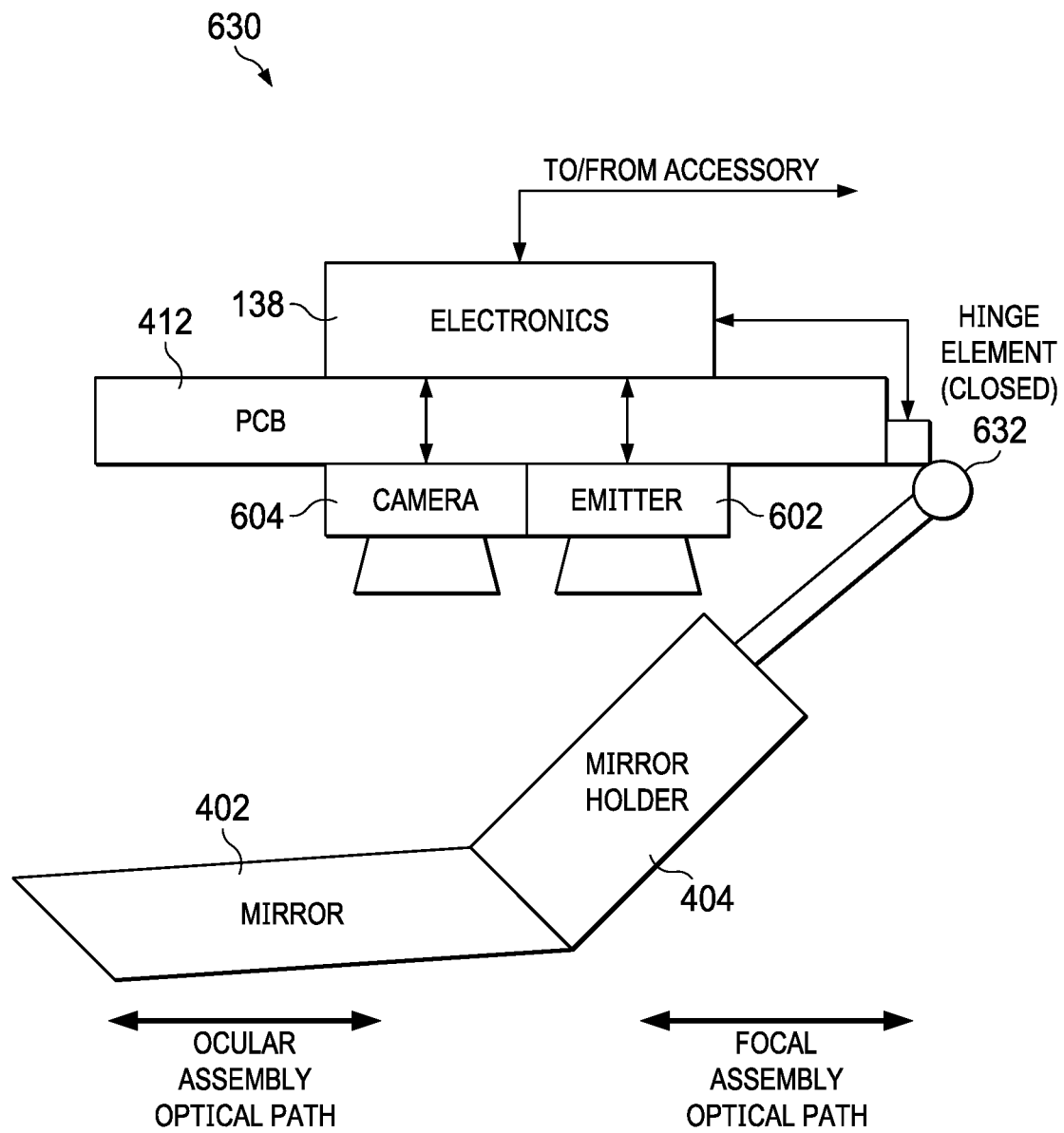
Figure 6D:
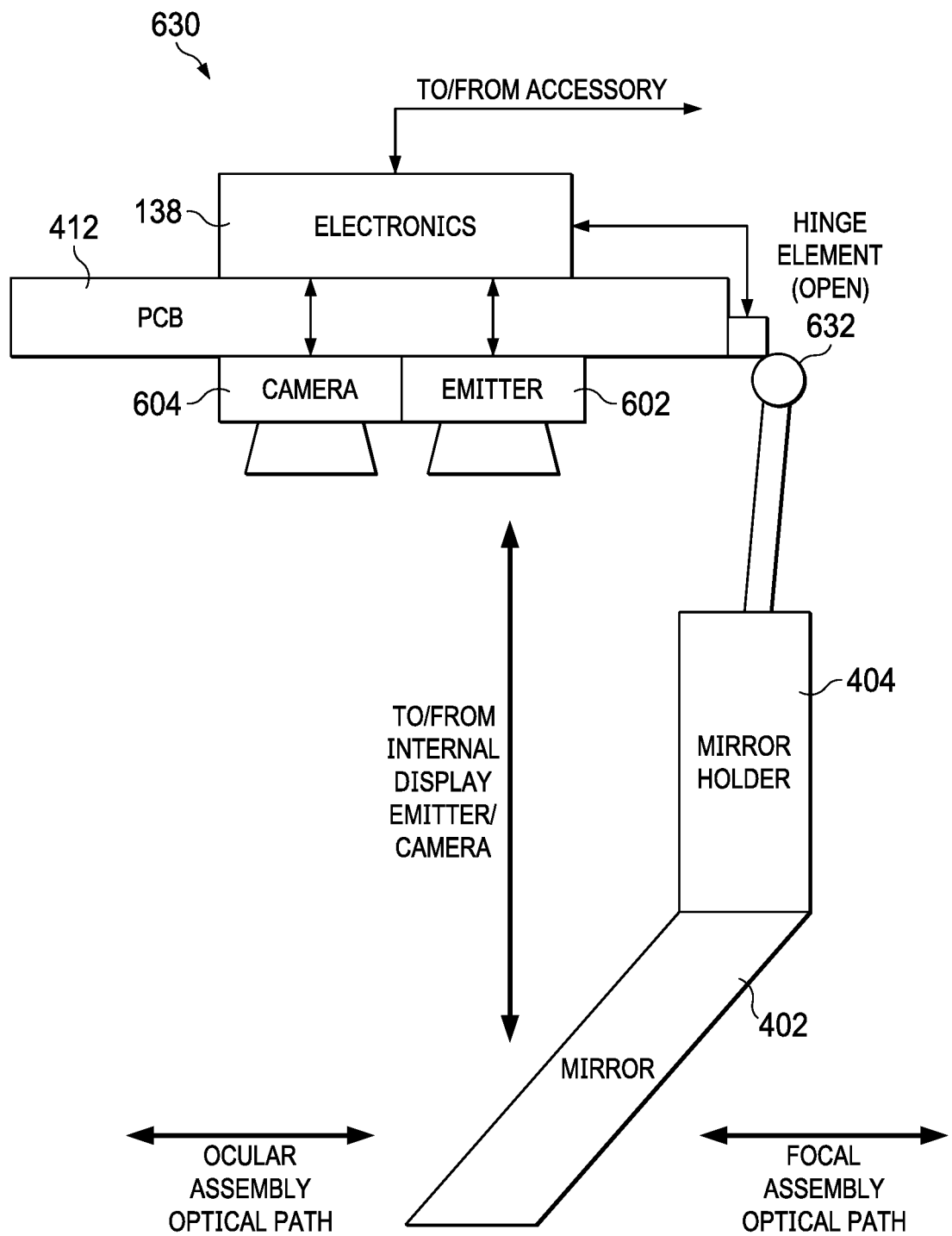

FIG. 6C illustrates another example extension/retraction mechanism, in a retracted state for another example internal display device 630. The internal display device 630 can include similar features as internal display device 102, but can include a different extension/retraction mechanism. The extension/retraction mechanism of internal display device 630 can include a hinge element 632. Hinge element 632 can be similarly controlled by the electronics 138. Without power or in an off state, the hinge element 632 closes, thereby rotating the mirror 402 out of the optical path. In FIG. 6D, the hinge element 632 is powered by the electronics, and opens, thereby rotating the mirror 402 into the optical path.

Figure 7A:
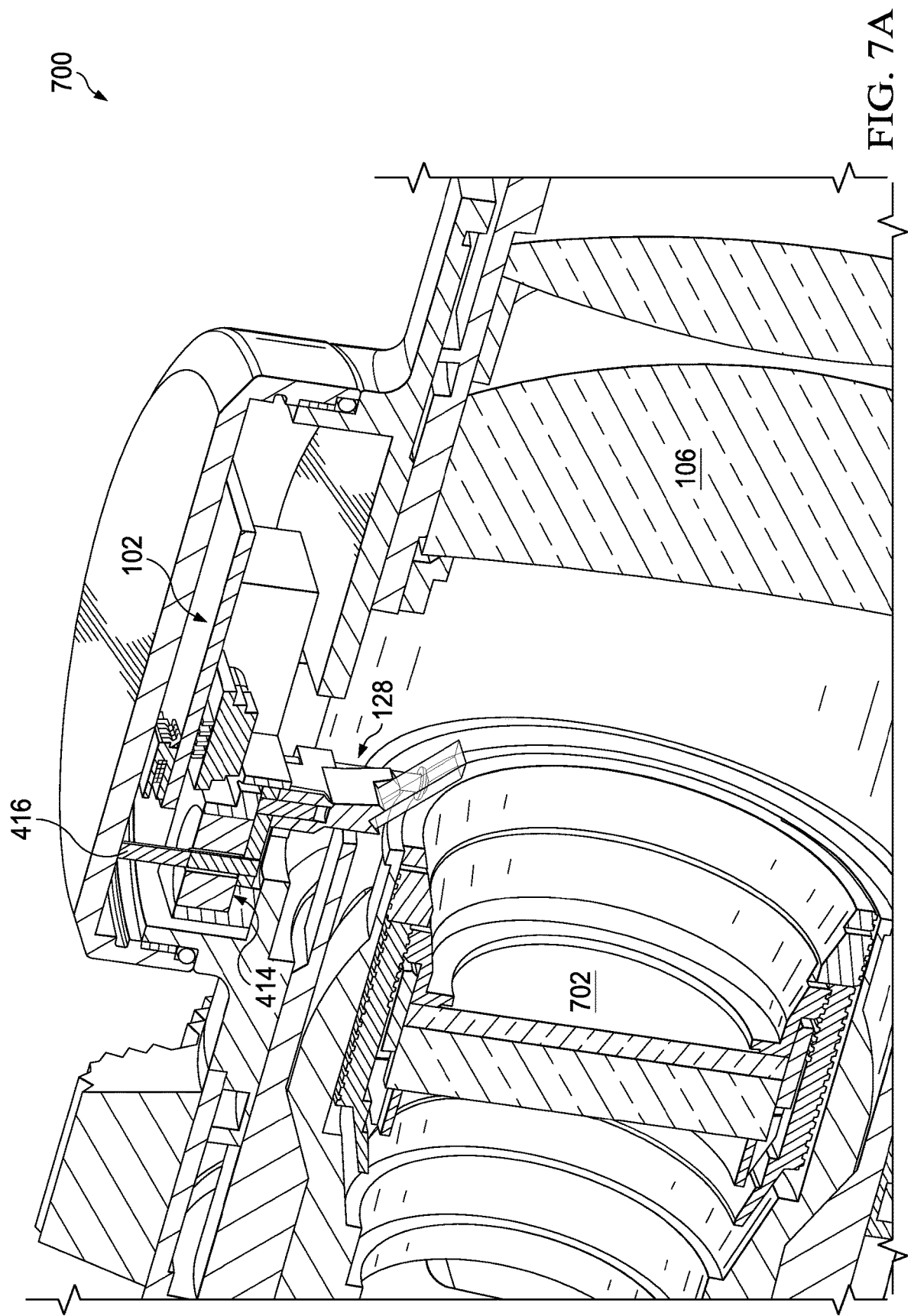
FIGS. 7A-B are schematic diagrams illustrating operation of an example mirror retraction and extension element within an example optical device in accordance with embodiments of the present disclosure.
Figure 7B:
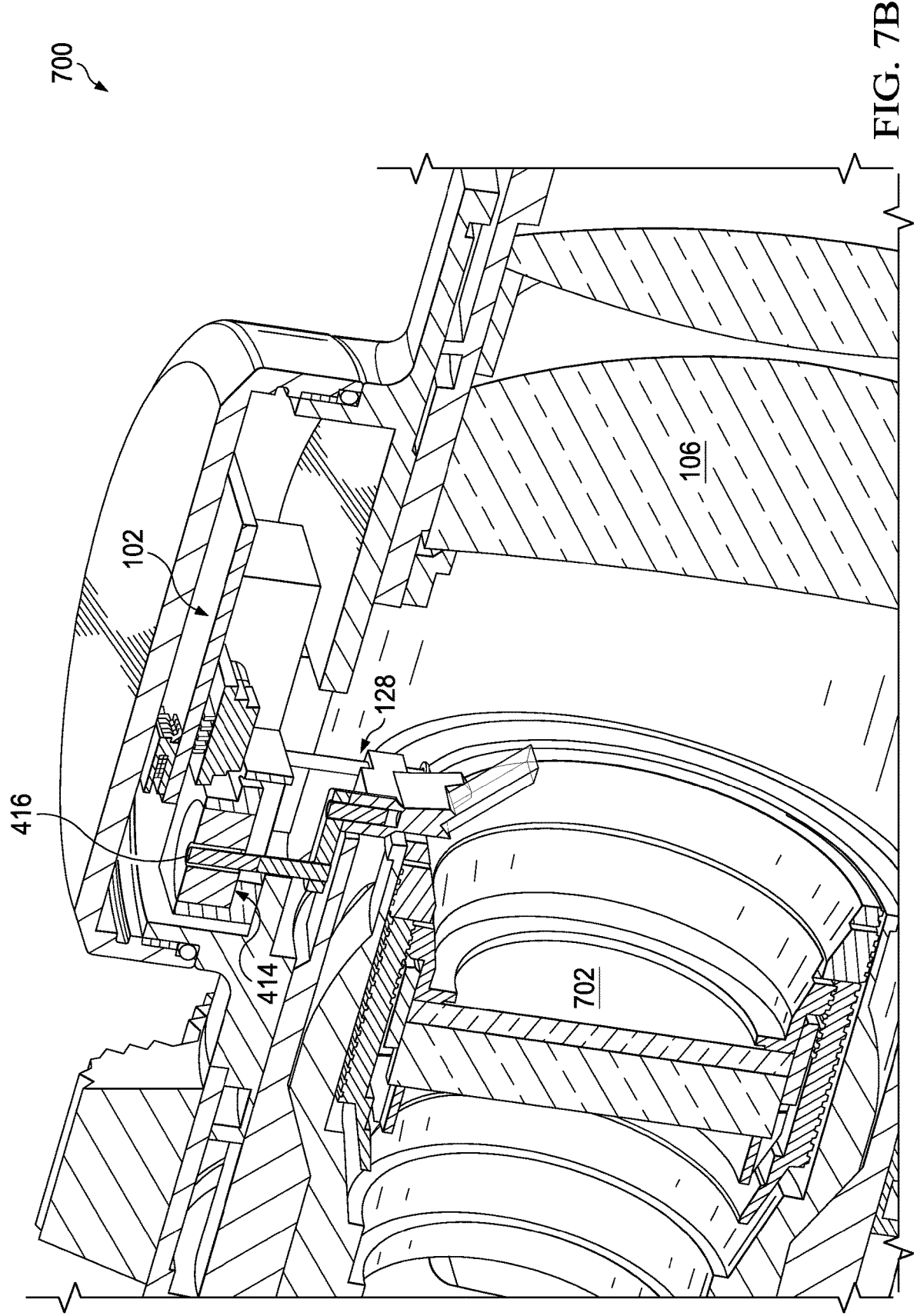

FIGS. 7A-B are schematic diagrams illustrating operation of an example mirror retraction and extension element within an example optical device in accordance with embodiments of the present disclosure. In FIG. 7A, the electromagnetic element 414 is in an off state, and the mirror assembly 128 is shown to position the mirror outside of the optical path between the reticle 702 and the remainder of ocular assembly 106. The axial magnetic element 416 is shown to be in the off position. In FIG. 7B, the electromagnetic element 414 receives power, and moves the axial magnetic element 416 down, pushing the mirror assembly 128 into the optical path.

FIGS. 8A-B are schematic diagrams illustrating operation of an example mirror retraction and extension element within an example optical device in accordance with embodiments of the present disclosure. FIGS. 8A-8B illustrate similar features as FIGS. 7A-7B in more detail. In the off state of FIG. 7A, the electromagnetic element 414 is unpowered, and without the magnetic interaction pushing the axial magnetic element 416 downwards, the spring tension of the springs 408 push the mirror holder upwards. In FIG. 8B, the electromagnetic element 414 is powered. The magnetic interaction between the electromagnetic element 414 and the axial magnetic element 416 causes the axial magnetic element 416 to slide downwards. The coupler 502 is rigidly affixed to both the axial magnetic element 416 and the mirror holder 404. The axial magnetic element 416 sliding downwards pushes the mirror holder 404 downwards along the dowel pins 406a-b.

Figure 9:
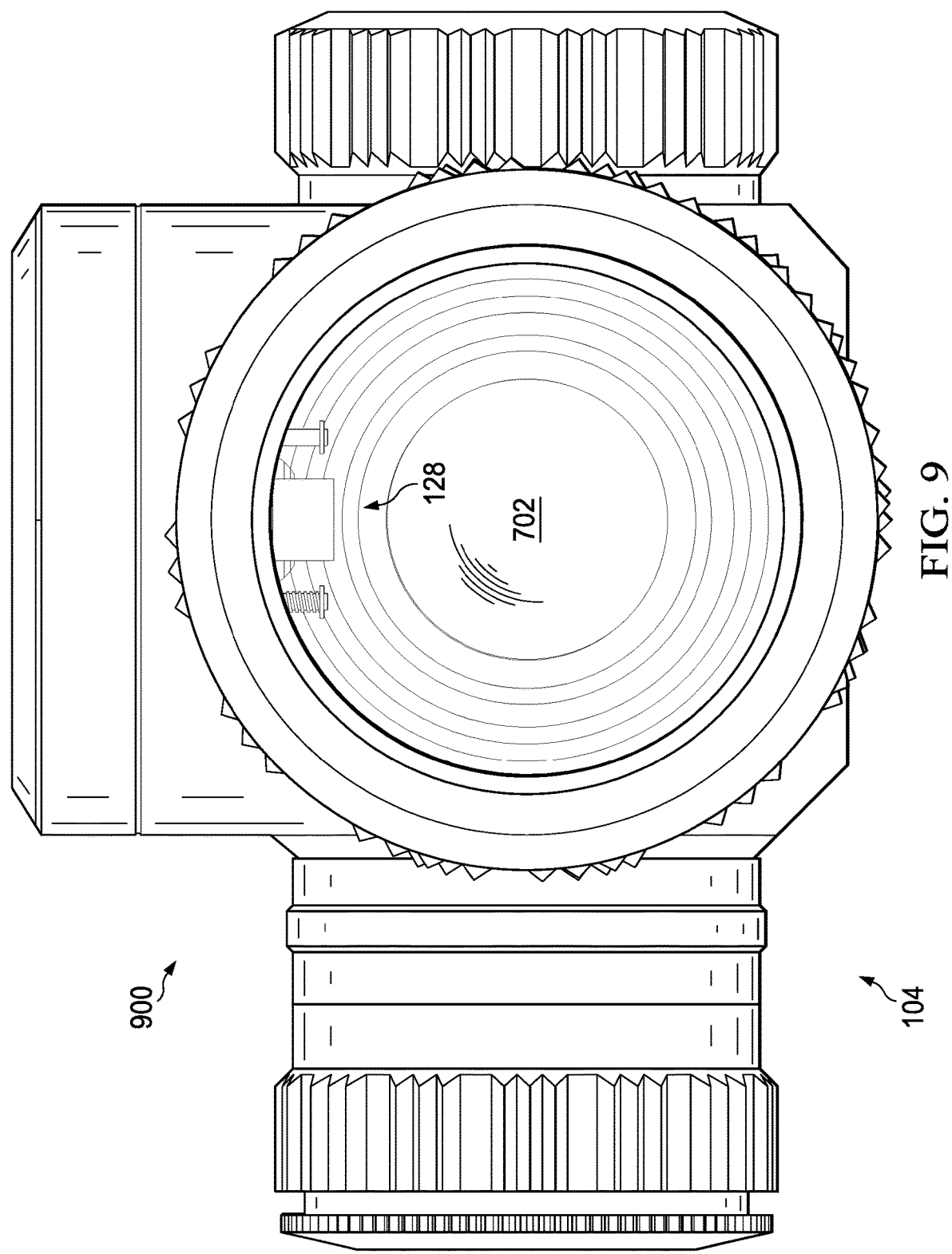
FIG. 9 is a schematic diagram of an optical device illustrating an internal display device retracted from an optical path of the optical device in accordance with embodiments of the present disclosure.

FIG. 9 is a schematic diagram of an optical device illustrating an internal display device retracted from an optical path of the optical device in accordance with embodiments of the present disclosure.

FIG. 10 is a schematic diagram 1000 illustrating example range finding data 1004 displayed on an internal display device 102 in an optical device 104 in accordance with embodiments of the present disclosure. The optical device 104 can be coupled to a range finder 1002, which is an example accessory 112. The range finder accessory 1002 can use a laser or other mechanism to determine distance information for an object. The distance information can be transmitted across a link 114 from the range finder 1002 to the internal display device 102. The internal display device 102 can project the distance information 1004 within the optical path of the optical device 104, as shown. The format for the distance information can include a single number with various degrees of precision, a scale that automatically slides to shown how the object distance is changing over time, different units of measurement, different colors, brightness levels, transparency levels, etc.

In some embodiments, the accessory 112 can provide augmented reality overlay information. In this example, the object is received by optical light information into the optical device, and directed to an image sensor. The image sensor can send the information to the accessory by the link 114, by a wireless connection, or to another location by a wireless location by the internal display device or by the accessory. In any case, the internal display device 102 can project image overlay information pertaining to the object. In this case, the image overlay information identifies the object as a male rocky mountain elk.

The internal display device 112 can also use the object information and position, location, distance, etc., to alert others of that information. For example, observers may be using optical device with internal display devices that are synchronized to each other. If one of them observes the male rocky mountain elk, that internal display device can (either by itself, through the accessory, or through another device), alert synchronized devices of the position, location, distance, and name of the object. A second user might see in their display a notification to look in a specific direction or an arrow pointing in a direction of the object, etc. Synchronicity allows multiple users to be alerted to the presence and position of objects of interest without having to remove themselves from their optical devices, which allows users to more quickly capture objects of interest within the optical device. The optical devices used by different users can be different. For example, one device can be a sniper scope while the other is a spotter scope. Information can be exchanged between the two different optical devices rapidly, allowing both members of a team to quickly acquire targets, and gain target information.

Figure 11A:
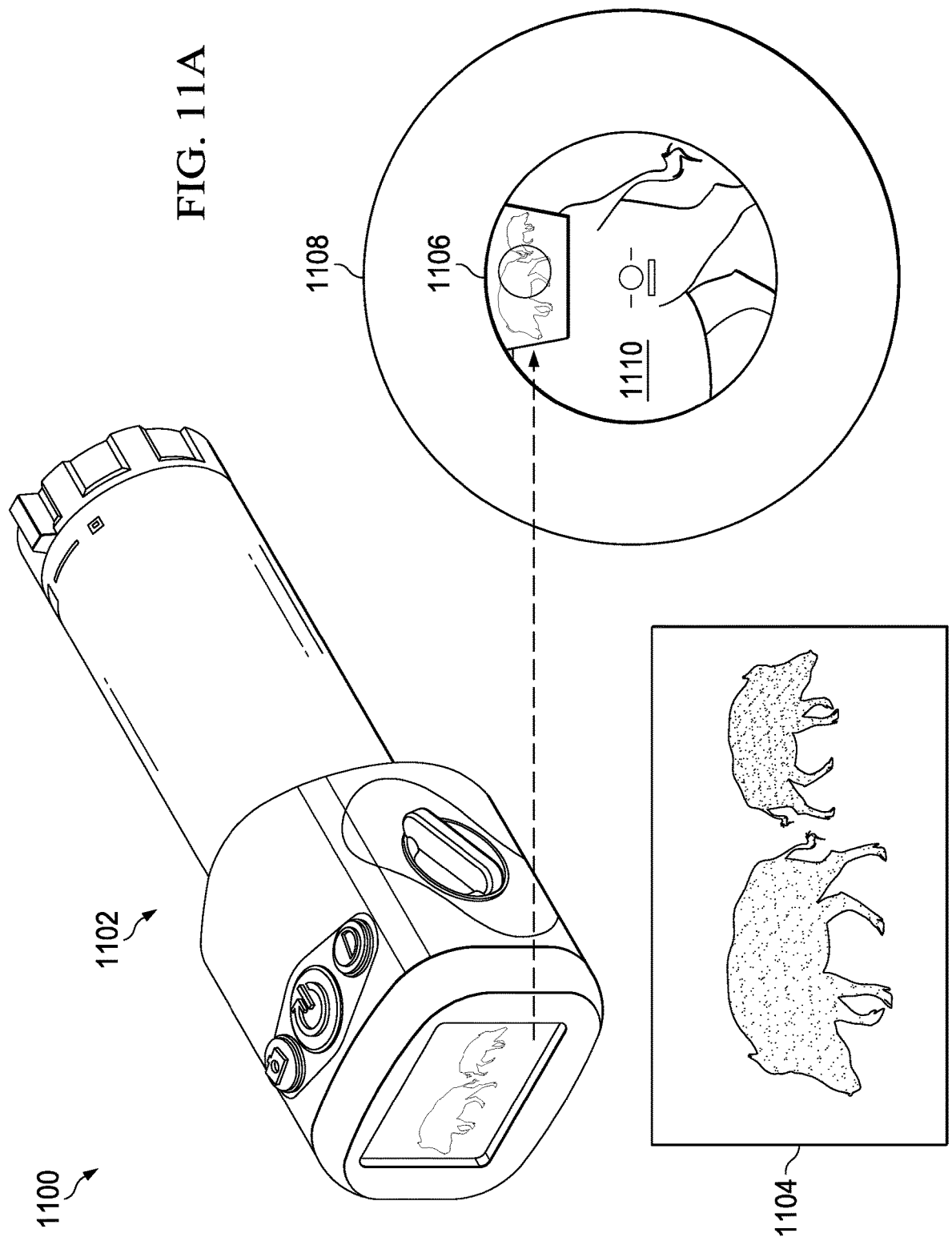
Figure 11B:
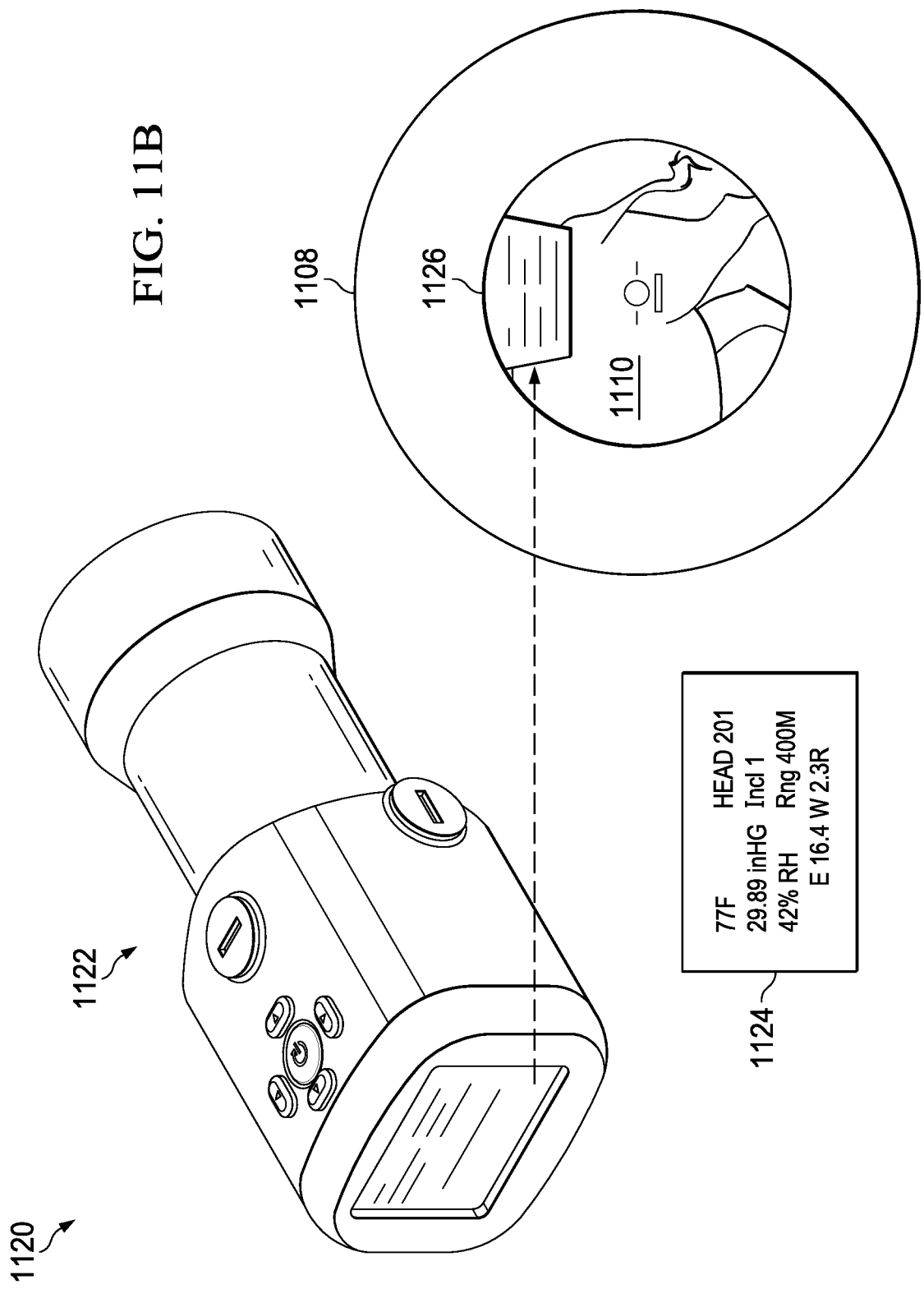

FIGS. 11A-C are schematic diagrams illustrating example data displayed on an internal display device in accordance with embodiments of the present disclosure. FIG. 11A is a diagram 1100 illustrating an example thermal imager 1102. Thermal imager 1102 can provide infrared information 1104 about an object. That infrared information 1106 can be projected into an optical path 1112 of an optical device 104 by the internal display device 102. As shown in FIG. 11A, often, the optical information 1110 observed from the optical path 1108 can be narrower in field-of-view than other optical devices, such as the thermal imager 1102. The projection of the thermal information 1106 can provide a wider field-of-view than the optical information 1110.

FIG. 11B is a diagram 1120 illustrating various telemetry information about an object. For example, a device 1122 can provide distance, windage, barometric, temperature, elevation, etc. information. Device 1122 can transmit that information over a link to the internal display device 102, which can provide displayed information 1126 in the optical path 1108.

FIG. 11C illustrates other example displayed information, including night vision/thermal information 1132, range finder/distance information 1134, and text message information 1136.

Figure 12:
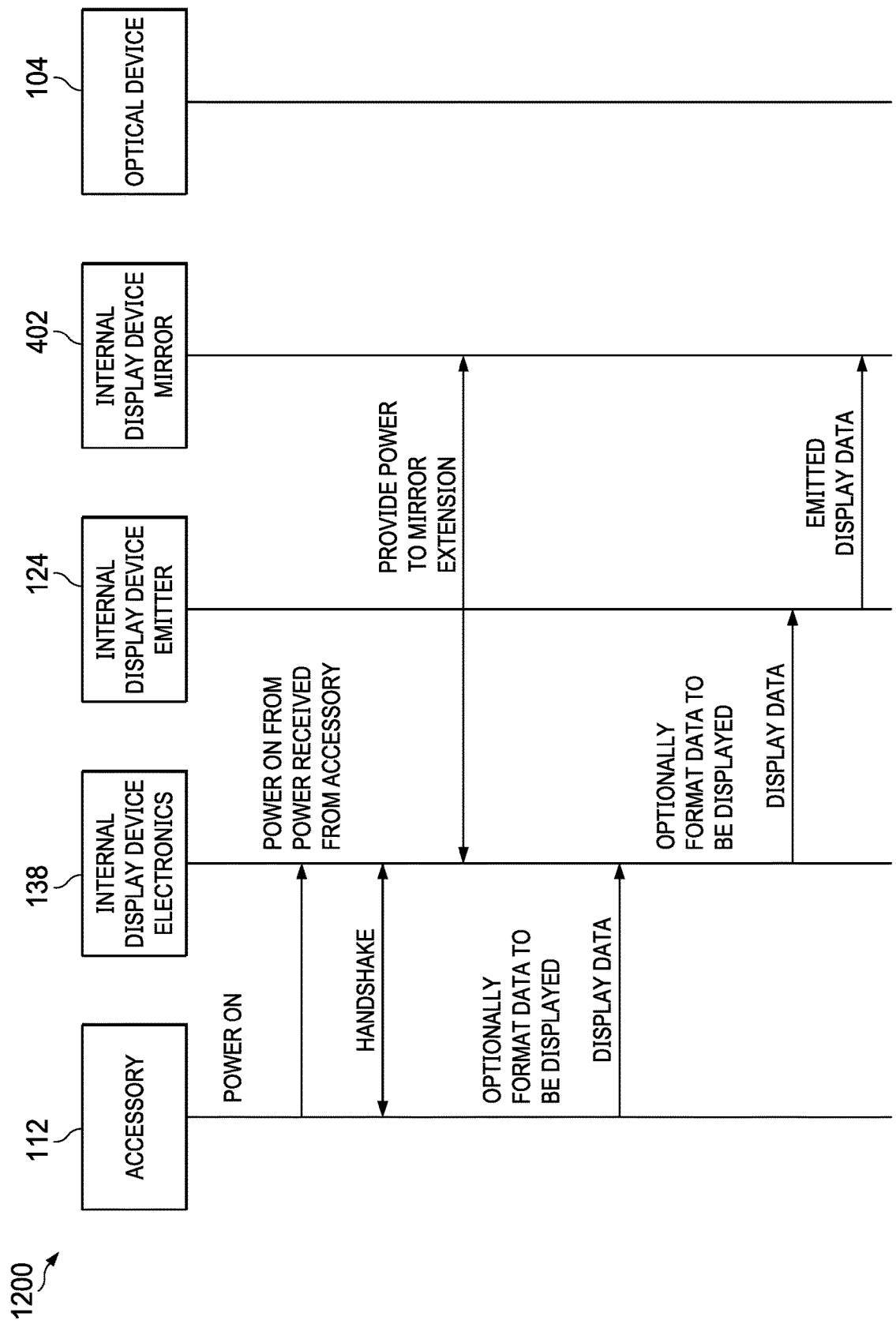
FIG. 12 is a swim lane diagram for initialization and operation of an internal display device coupled to an accessory in accordance with embodiments of the present disclosure.

FIG. 12 is a swim lane diagram for initialization and operation of an internal display device coupled to an accessory in accordance with embodiments of the present disclosure. An accessory 112 can be coupled to the internal display device 102 integrated into an optical device 104 by a link. When the accessory 112 to linked to the internal display device 102 and power is provided to the accessory 112, the accessory can provide power to the internal display device 102 (e.g., by electronics 138). During an initial handshake, the accessory 112 and internal display device 102 can exchange configuration information and capability information. The electronics can also use the power received from the accessory to extend the mirror 402 into the optical path of the optical device. The accessory 112 can then provide display data to the electronics 138, either preformatted or not. If not, then the electronics 138 can format the display data for display. The electronics 138 can provide the data to the emitter 124, which can project the display data onto the mirror 402 in the appropriate format.

Figure 13A:
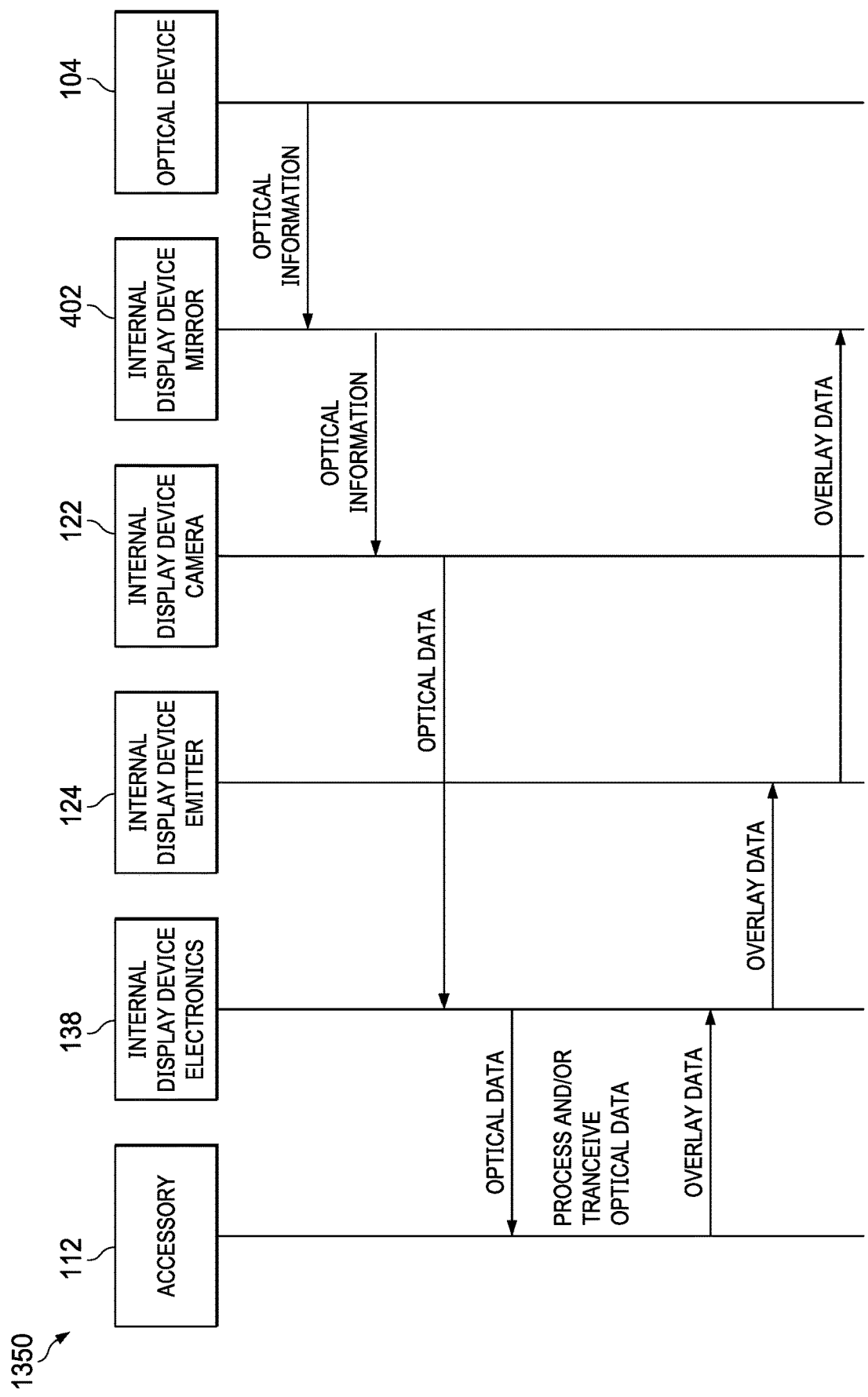
FIGS. 13A-B are swim lane diagrams for displaying image overlay information onto an internal display device based on optical inputs from an optical device in accordance with embodiments of the present disclosure.
Figure 13B:
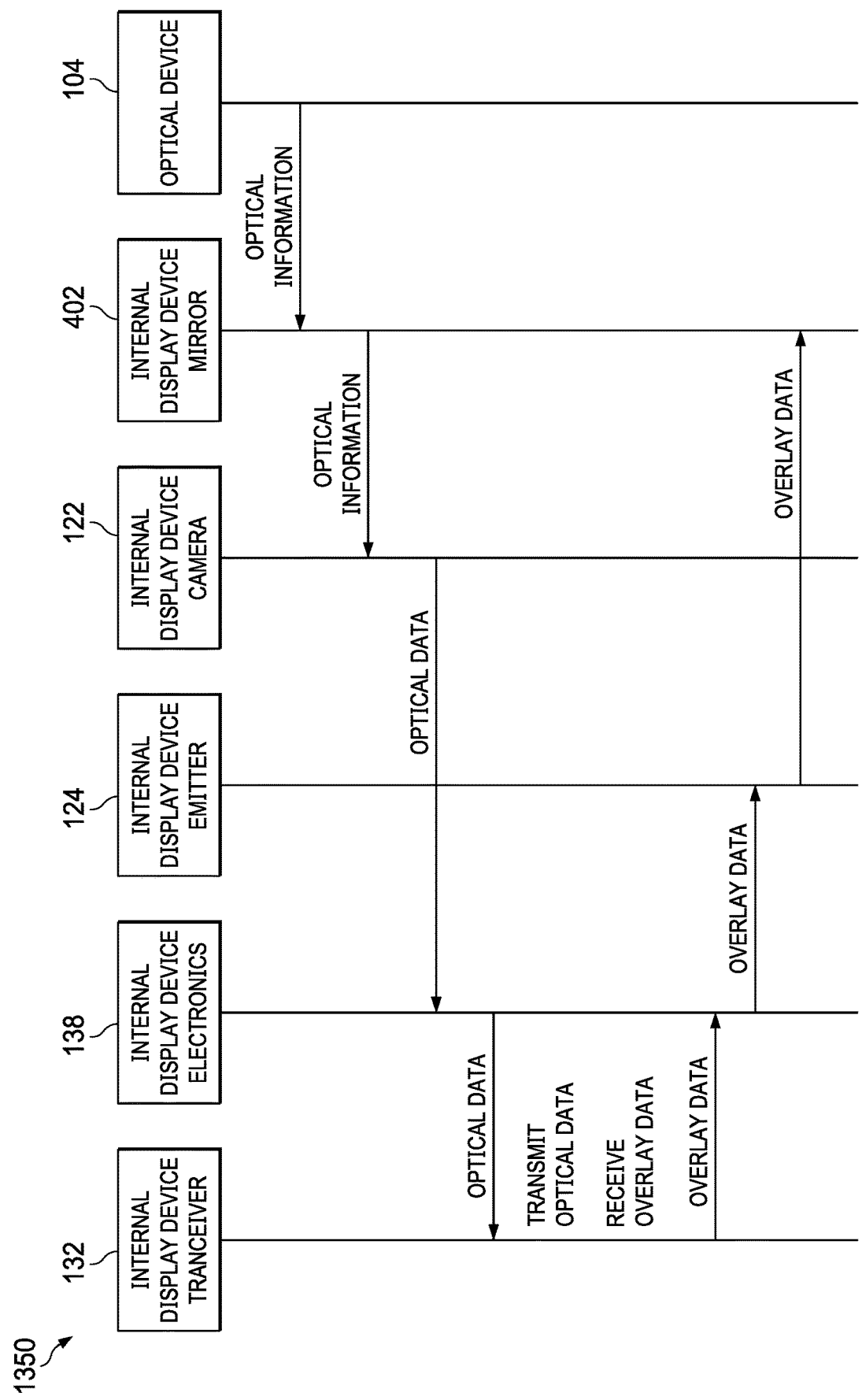

FIGS. 13A-B are swim lane diagrams for displaying image overlay information onto an internal display device based on optical inputs from an optical device in accordance with embodiments of the present disclosure. In FIGS. 13A-B, the optical device 104 can receive optical information about an object. That optical information can be captured by an image sensor of a camera 122 for example. The camera 122 can convert that optical information into electrical signals, and send those electrical signals to electronics 138 for processing and storage. In FIG. 13A, the electronics 138 can transmit the electrical signals to the accessory over a link 114. The accessory 112 can process that information internally or can send that information to another location for processing. The accessory 112 can then transmit overlay information to the electronics 138. The electronics can then cause the emitter 124 to project overly information into the optical path of the optical device 104. Formatting of the overlay information can be done either by the accessory 112 or by the electronics 138.

In FIG. 13B, instead of sending the electrical signals that represent the optical information to the accessory over a link 114, the internal display device 102 can send that information to another location by an internal transceiver 132. The internal display device 102 can receive overlay information by the transceiver 132 for display by the emitter 124 onto mirror 402.

Figure 14A:
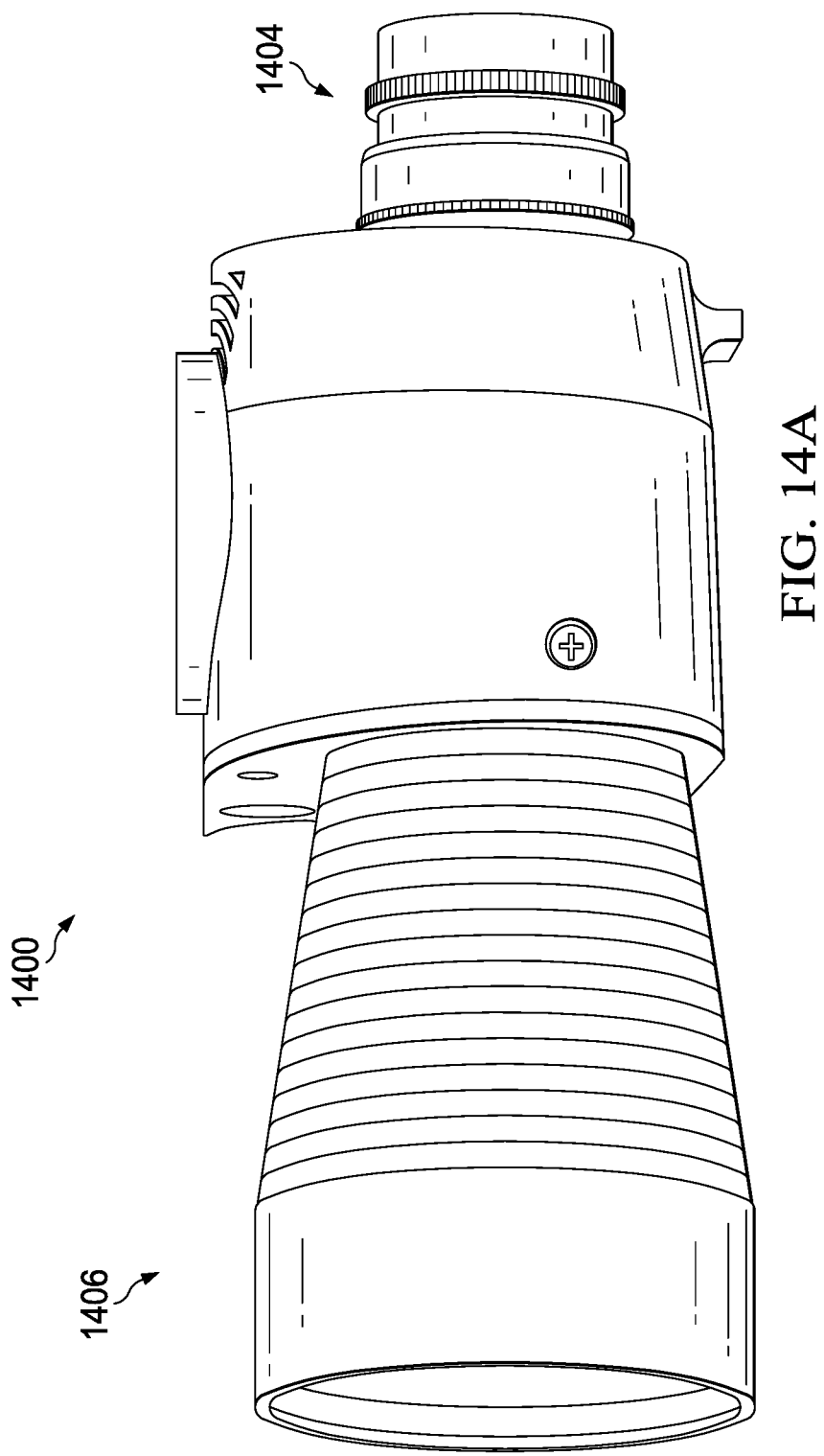
FIG. 14A is a schematic diagram of an example binocular that includes one or more internal display devices in accordance with embodiments of the present disclosure.
Figure 14B:
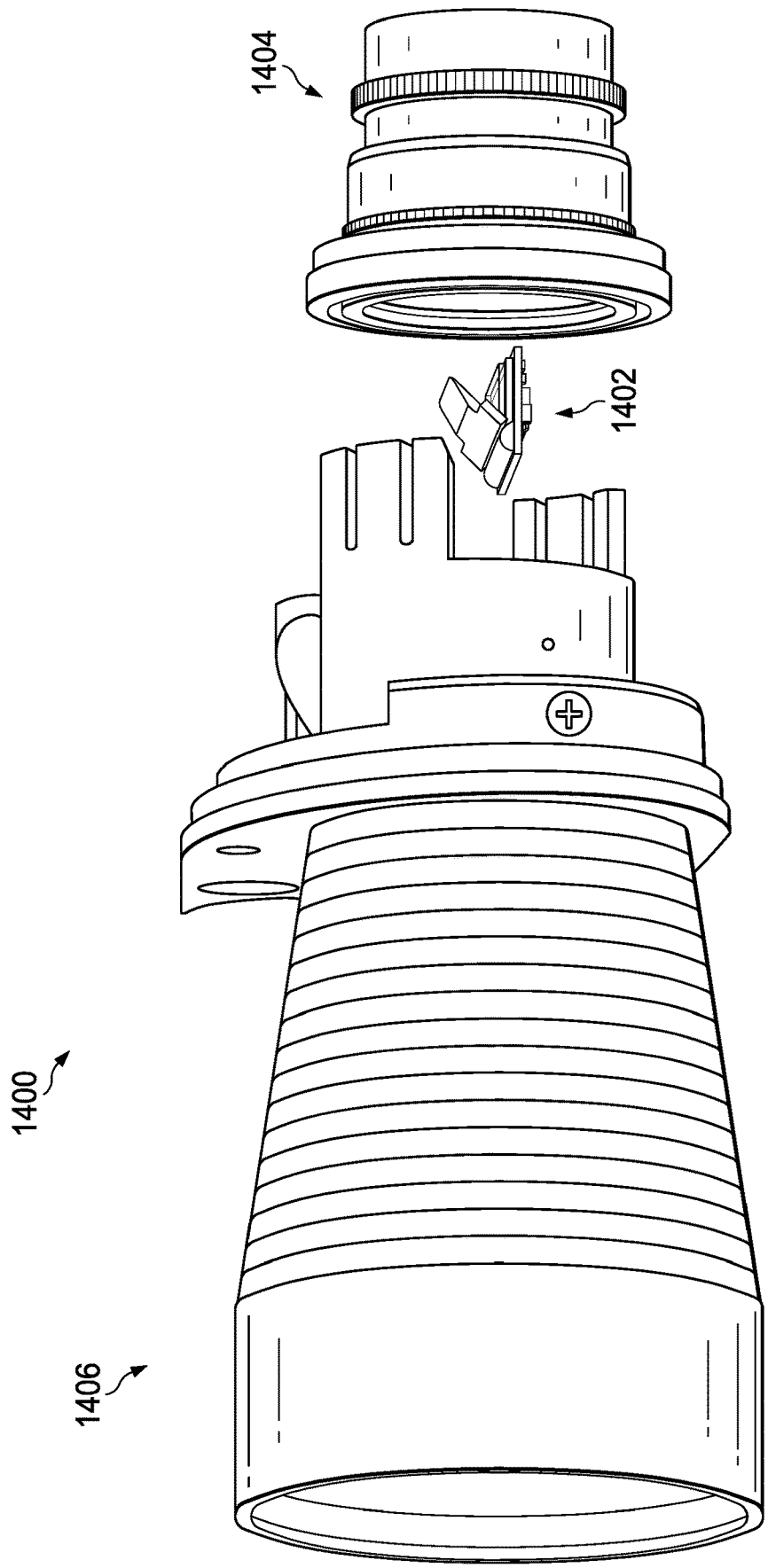
FIG. 14B is a schematic diagram of an example binocular illustrating an example location of an internal display device in accordance with embodiments of the present disclosure.

FIG. 14A is a schematic diagram of an example binocular 1400 that includes one or more internal display devices in accordance with embodiments of the present disclosure. FIG. 14B is a schematic diagram of an example binocular 1400 illustrating an example location of an internal display device 1402 in accordance with embodiments of the present disclosure. The binoculars 1400 can include an ocular assembly 1404 and an objective assembly 1406. The binoculars 1400 can include two general optical assemblies, each with an ocular assembly and an objective assembly. In embodiments, each optical assembly of the binocular can include an internal display device, with each internal display device providing different information. In embodiments, one of the two optical assemblies can include an internal display device.

In the embodiment shown in FIG. 14B, the internal display device 1402 is shown proximate the ocular assembly of the binocular 1400. The internal display device 1402 is also shown to be positioned near the bottom of the binocular housing. The internal display device can be positioned at other locations within the optical path.

Figure 15A:
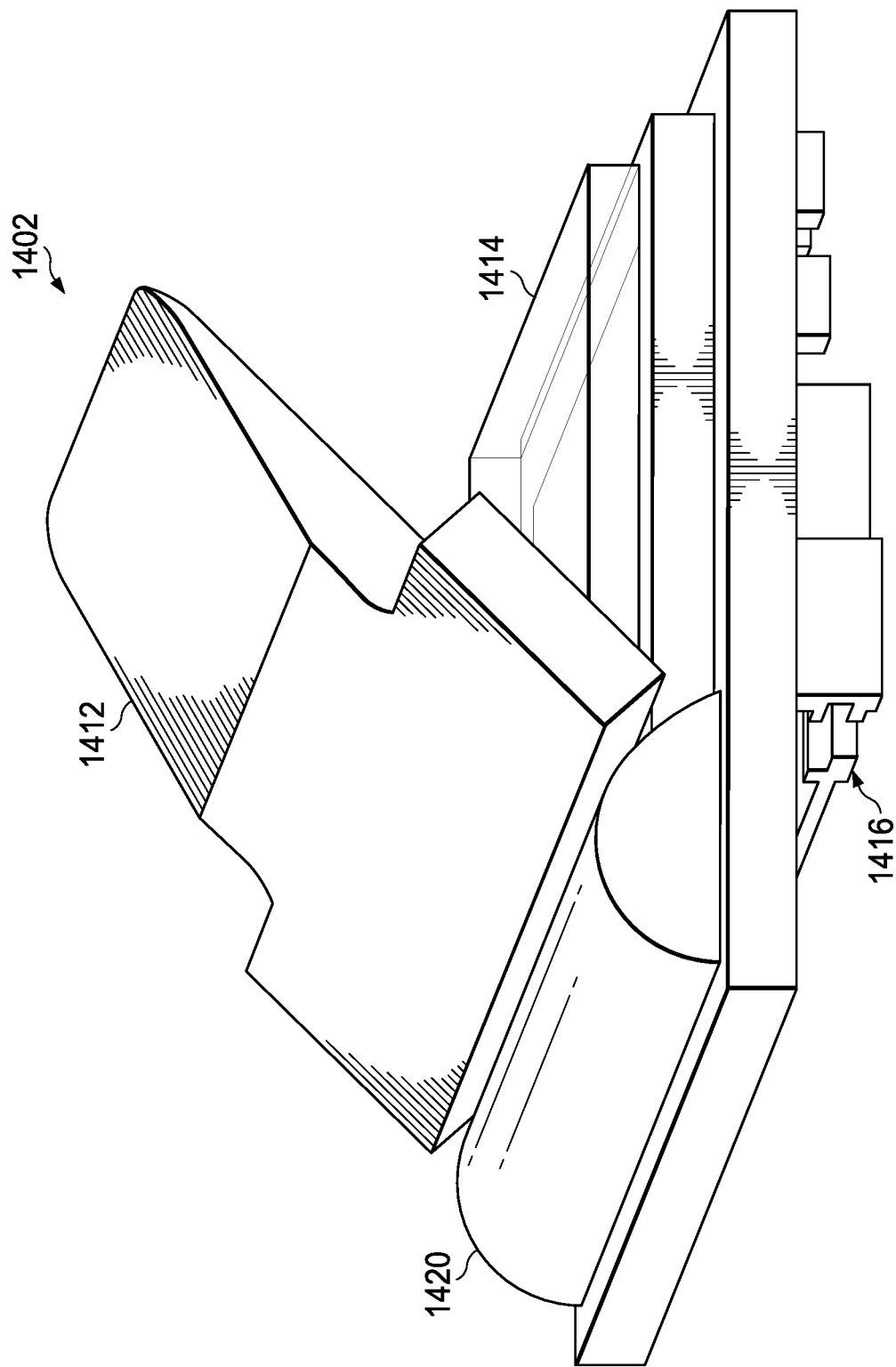
FIGS. 15A-B are schematic illustrations of an example internal display device in accordance with embodiments of the present disclosure.
Figure 15B:
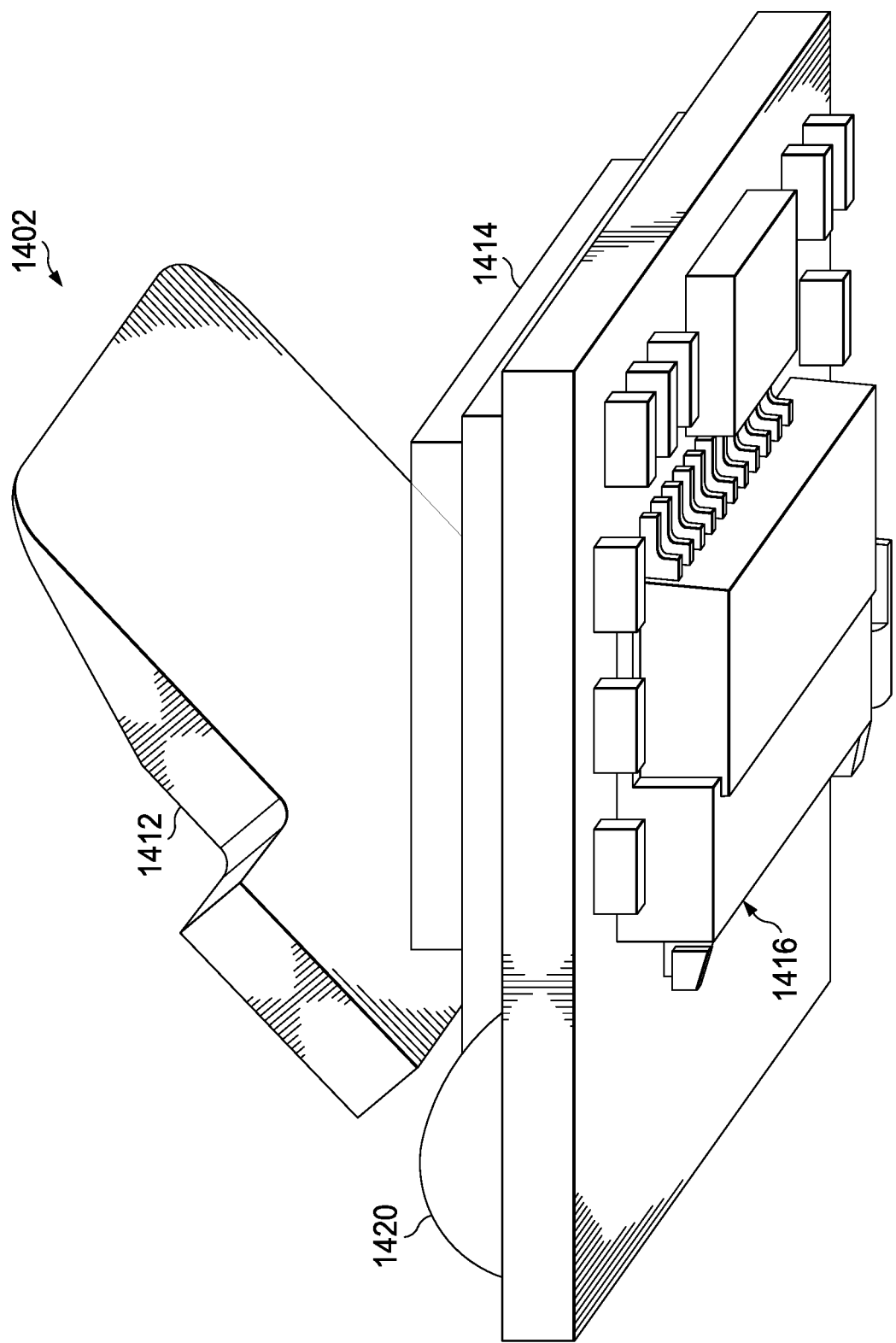

FIGS. 15A-B are schematic illustrations of an example internal display device 1402 in accordance with embodiments of the present disclosure. The internal display device 1402 can be similar in functionality and operation as internal display device 102, described above, thought different (slightly) in structure. The internal display device 1402 can include a reflective element 1412. Reflective element 1412 can be a mirror, such as a transparent mirror, for redirecting emissions from the emitter 1414 towards the ocular assembly 1404 in the optical path of the binocular's optical assembly. The reflective element 1412 can be similar to mirror 402. Emitter 1414 can be similar to emitter 124. The emitter 1414 can emit image information towards reflective element 1412 that the internal display device 1402 receives from a connected accessory. Electronics 1416 can provide processing, memory, formatting, communications, and interface functionality for the internal display device 1402. In embodiments, the internal display device 1402 can include a hinge 1420 that can cause the reflective element 1412 to move into or out of the optical path of the optical assembly. The electronics 1416 can provide control functionality to the hinge to move the reflective element.

The following examples pertain to various embodiments described herein:

In a first example, an internal display device integrated or coupled to an optical device. The internal display can include a mirror assembly that positions an optical element within an optical path of the optical device. The internal display device can include an extension mechanism that extends the optical element into the optical path when powered, and withdraws the mirror from the optical path when unpowered or deactivated.

In another example, the internal display device can receive power from an accessory across a wired link. The power received from the accessory can power the internal display device electronics.

In another example, the internal display device can include a brightness sensor to adjust brightness of the displayed information automatically.

In another example, the extension mechanism includes an electromagnetic element or a hinge.

In another example, the internal display device can include an image sensor that can receive optical information from the optical path. The image sensor can convert optical information to electrical signals. The electrical signals can be sent to another location by the link or by a wireless transceiver. Image overlay information can be received by the internal display device for displaying onto the optical element and to coincide with a position of an object of interest.

In another example, the optical element can be a transparent mirror, two-way mirror, one way mirror or other mirror type.

In another example, the optical element is any optical element that can redirect optical information from the emitter of the internal display device into the optical path of the optical device.

In another example, the internal display device includes an emitter to emit light from the internal display device onto the optical element. The emitter can be a projector, monitor, LED, LCD, laser scanning device or other light emitter.

In another example, the optical device can be a scope, binoculars, monoculars. The accessory can be a thermal imager, night vision device, windage device, range finder, cellular device, wi-fi enabled device, etc.

In another example, the link can be a USB link, micro-USB link, Thunderbolt link, multimedia link, video link, HDMI, VGA, displayPort link, proprietary link, etc. The internal display device can include a port that is compliant with a link or interconnect protocol for exchanging configuration information, capabilities information, power, data, etc. between the internal display device and the accessory.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In some embodiments, a signal can originate from a device or accessory. The signal can include one or a combination of data signals, power, control information, etc. The signal can be carried over a wireline cable, which can include a conductive cable, fiber optic cable, or other signal carrier. The signal, in some cases, can also be transmitted or received wirelessly. In some embodiments, a signal originating from the accessory device can cause the internal display device to perform an action. For example, a signal can originate from the accessory, such as a power signal or an activation signal. The signal can be received and processed by the hardware circuitry of the internal display device. The internal display device can then take certain actions based on that signal, such as cause the display holder to position the display element within the optical path of the optical device. In this example, it is understood that the internal display device performs the action of moving the display into the optical path based on the signal originating from the accessory device, even if that signal is processed by the internal display device, and the internal display device creates a new signal that causes the action.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An optical device comprising:
a housing,
an objective lens at a first end of the housing and supported by the housing,
an ocular lens at a second end of the housing and supported by the housing,
an optical path defined from the objective lens through the housing to the ocular lens;
a display device supported by the housing proximate the second end of the housing, the display device comprising:
a display,
hardware logic circuitry to process display data and to display the display data on the display, and
a display holder to position the display into and out of the optical path based on power received by the display device; and
a light emitter to project optical-based information onto the display, wherein the display comprises a mirror to direct optical-based information from the light emitter to the ocular lens.

2. The optical device of claim 1, further comprising a port to electrically couple the display device with an accessory by a cable,
wherein the hardware logic circuitry is to receive power from the accessory, and upon receiving power from the accessory, to cause the display holder to position the display within the optical path.

3. The optical device of claim 1, wherein the display holder comprises a spring mechanism to move the display into the optical path.

4. The optical device of claim 1, wherein the display holder comprises a magnetic element to move the display into the optical path.

5. The optical device of claim 1, further comprising a light detector; and wherein the mirror is to direct light from the optical path to the light detector.

6. The optical device of claim 5, wherein the light detector comprises one of a camera, charge coupled device (CCD), or light-sensitive diode.

7. The optical device of claim 1, wherein the optical device comprises a scope or binoculars.

8. A system comprising:
an optical device; and
an accessory device;
the optical device comprising:
a housing,
an objective lens at a first end of the housing and supported by the housing,
an ocular lens at a second end of the housing and supported by the housing, and
an optical path defined from the objective lens through the housing to the ocular lens;
a display device supported by the housing proximate the second end of the housing, the display device comprising:
a display comprising a mirror,
hardware logic circuitry to process display data and to display the display data on the display,
an input port, and
a display holder to position the display in the optical path in the presence of a signal from the accessory device and to position the display out of the optical path in the absence of a signal from the accessory device; and
a light emitter to project optical-based information onto the display;
the accessory device coupled to the display device through the input port by a cable, the accessory device comprising:
a power source to power the accessory device and the display device; and
hardware circuitry to:
receive display protocol information from the display device,
configure display data based on the display protocol of the display device, and
transmit the configured display data to the display device.

9. The system of claim 8, wherein the hardware logic circuitry is to receive power from the accessory, and upon receiving power from the accessory, to cause the display holder to position the display within the optical path.

10. The system of claim 8, wherein the display holder comprises a spring mechanism to move the display into the optical path based on receiving a signal from the accessory device.

11. The system of claim 8, wherein the display holder comprises a magnetic element, the magnetic element to create a magnetic field in the presence of a signal originating from the accessory device, the magnetic field to cause the display holder to position the display into the optical path.

12. The system of claim 8, further comprising a light emitter to project optical-based information onto the display, wherein the display comprises a mirror to direct optical-based information from the light emitter to the ocular lens.

13. The system of claim 12, further comprising a light detector; and wherein the mirror is to direct light from the optical path to the light detector.

14. The system of claim 13, wherein the light detector comprises one of a camera, charge coupled device (CCD), or light-sensitive diode.

15. The system of claim 8, wherein the optical device comprises a scope or binoculars.

16. The system of claim 8, wherein the accessory device comprises one or more of a range finder device, a thermal imager, a night vision scope, a target acquisition device, a communications device, or a windage device.

17. A method comprising:
receiving, at a display device of an optical device, an input signal from an accessory device;
causing a display of the display device to move into an optical path of the optical device based on the input signal;
receiving optical data from the optical path;
capturing the optical data by an image sensor;
converting the optical data into electrical signals;
transmitting the electrical signals to the accessory device;
receiving feedback information from the accessory device in the form of displayable data; and
displaying the feedback information on the display.

18. The method of claim 17, further comprising:
receiving an initialization signal prior to the first input signal; and
responding to the initialization signal with device driver information associated with the display device.

\* \* \* \* \*

UNITED STATES PATENT AND TRADEMARK OFFICE
CERTIFICATE OF CORRECTION

PATENT NO. : 12,079,531 B2  
APPLICATION NO. : 17/424152  
DATED : September 3, 2024  
INVENTOR(S) : Leo Volfson Page 1 of 1

It is certified that error appears in the above-identified patent and that said Letters Patent is hereby corrected as shown below:

In the Claims

Column 19, Line 2, in Claim 18: delete "first"

Signed and Sealed this  
Twenty-second Day of July, 2025

Coke Morgan Stewart  
*Acting Director of the United States Patent and Trademark Office*